(12) United States Patent
Schillebeeckx et al.

(10) Patent No.: US 10,455,138 B2
(45) Date of Patent: Oct. 22, 2019

(54) CAMERA CALIBRATION WITH LENTICULAR ARRAYS

(71) Applicant: WASHINGTON UNIVERSITY, St. Louis, MO (US)

(72) Inventors: Ian Schillebeeckx, St. Louis, MO (US); Robert Pless, St. Louis, MO (US)

(73) Assignees: Ian Schillebeeckx, San Francisco, CA (US); Robert Pless, Washington, DC (US)

( * ) Notice: Subject to any disclaimer, the term of this patent is extended or adjusted under 35 U.S.C. 154(b) by 0 days.

(21) Appl. No.: 15/567,746

(22) PCT Filed: Apr. 20, 2016

(86) PCT No.: PCT/US2016/028379
§ 371 (c)(1),
(2) Date: Oct. 19, 2017

(87) PCT Pub. No.: WO2016/172167
PCT Pub. Date: Oct. 27, 2016

(65) Prior Publication Data
US 2018/0131861 A1    May 10, 2018

Related U.S. Application Data

(60) Provisional application No. 62/150,028, filed on Apr. 20, 2015.

(51) Int. Cl.
*H04N 5/232* (2006.01)
*H04N 17/00* (2006.01)
(Continued)

(52) U.S. Cl.
CPC ......... *H04N 5/23212* (2013.01); *G03B 13/36* (2013.01); *G06T 7/80* (2017.01);
(Continued)

(58) Field of Classification Search
CPC .. H04N 5/23212; H04N 17/002; G03B 13/36; G06T 7/80; G06T 2200/21; G06T 2207/10052
See application file for complete search history.

(56) References Cited

U.S. PATENT DOCUMENTS 5,455,689 A    10/1995   Taylor et al.
6,574,042 B2    6/2003   Allio
(Continued)

FOREIGN PATENT DOCUMENTS

EP    2597881 A2    5/2013

OTHER PUBLICATIONS

International Search Report and Written Opinion for International Application No. PCT/US2016/028379, dated Apr. 20, 2016, 6 pages.

*Primary Examiner* — Gevell V Selby

(57) ABSTRACT

The present disclosure is directed to an approach to solve camera calibration from a single picture of a simply structured light field created by viewing a carefully designed lenticular sheet. The lenticular sheet has different colors visible at different relative orientations and gives linear constraints on the K-1?R matrix which can be decomposed to give the rotation and calibration. The method uses geometric cues from hue measurements and does not require a correspondence between a point in the image and a point on the calibration pattern.

8 Claims, 34 Drawing Sheets

(51) Int. Cl.
*G06T 7/80* (2017.01)
*G03B 13/36* (2006.01)

(52) U.S. Cl.
CPC ....... H04N 17/002 (2013.01); *G06T 2200/21* (2013.01); *G06T 2207/10052* (2013.01)

(56) References Cited

U.S. PATENT DOCUMENTS

| | | |
|---|---|---|
| 8,922,644 B2 | 12/2014 | Larsen |
| 2006/0152434 A1 | 7/2006 | Sauer et al. |
| 2006/0245063 A1 | 11/2006 | Ra et al. |
| 2007/0188517 A1* | 8/2007 | Takaki ................. H04N 13/317 348/E13.029 |
| 2009/0273679 A1 | 11/2009 | Gere et al. |
| 2010/0112469 A1* | 5/2010 | Miyaharu .............. G03B 27/54 430/30 |
| 2012/0127320 A1 | 5/2012 | Balogh |
| 2014/0015942 A1* | 1/2014 | Said ................... G02B 27/2214 348/59 |
| 2015/0268035 A1* | 9/2015 | Furihata ................ G01B 11/14 348/136 |
| 2016/0029017 A1* | 1/2016 | Liang ....................... G06T 7/80 348/175 |

* cited by examiner

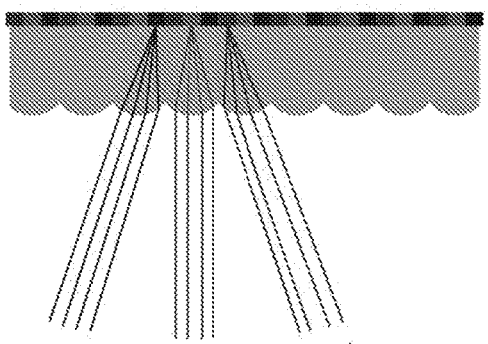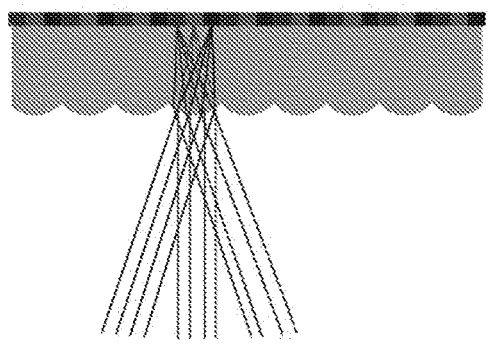
FIG. 11A                FIG. 11B
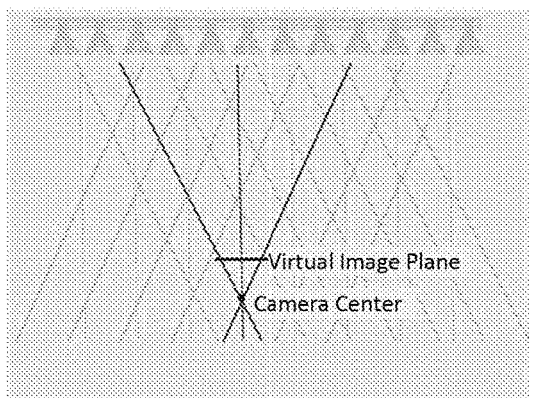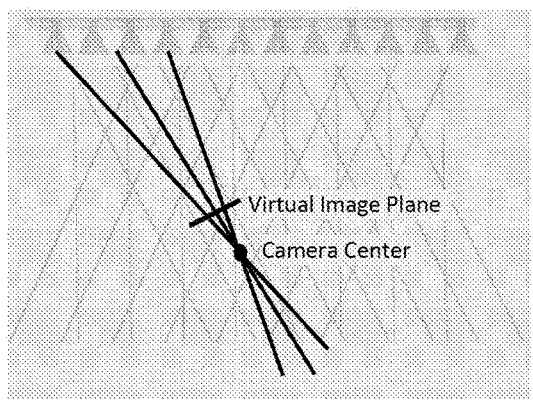
FIG. 11C                FIG. 11D

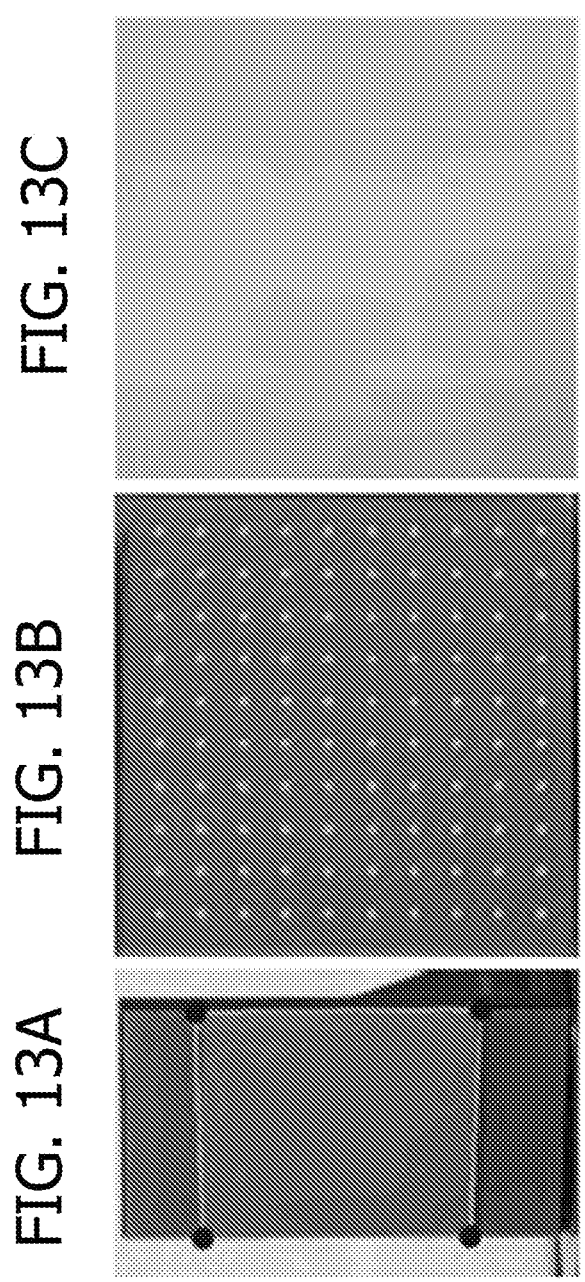

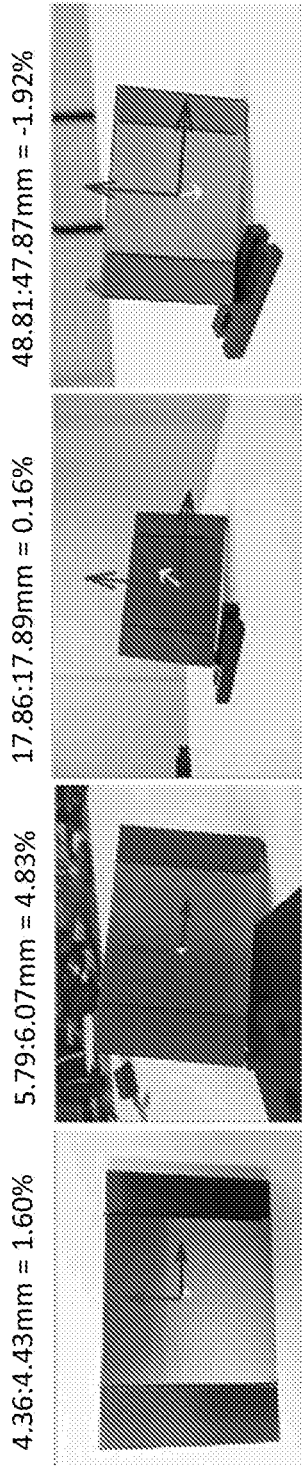
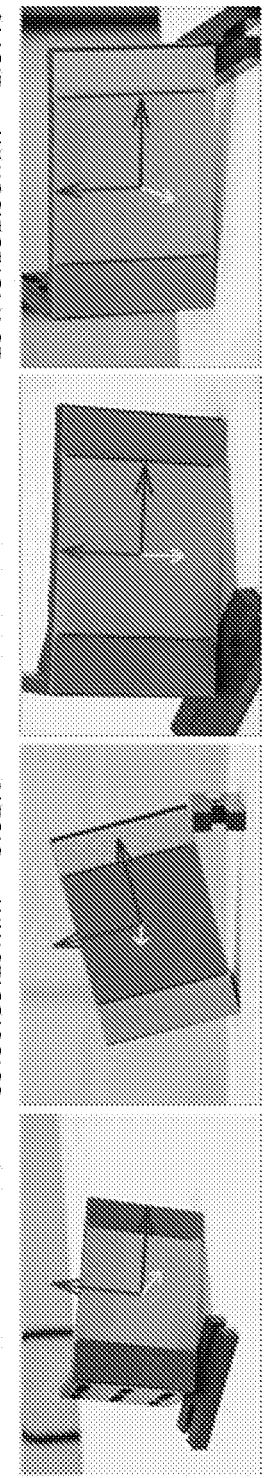
FIG. 18A  FIG. 18B  FIG. 18C  FIG. 18D  FIG. 18E  FIG. 18F  FIG. 18G  FIG. 18H

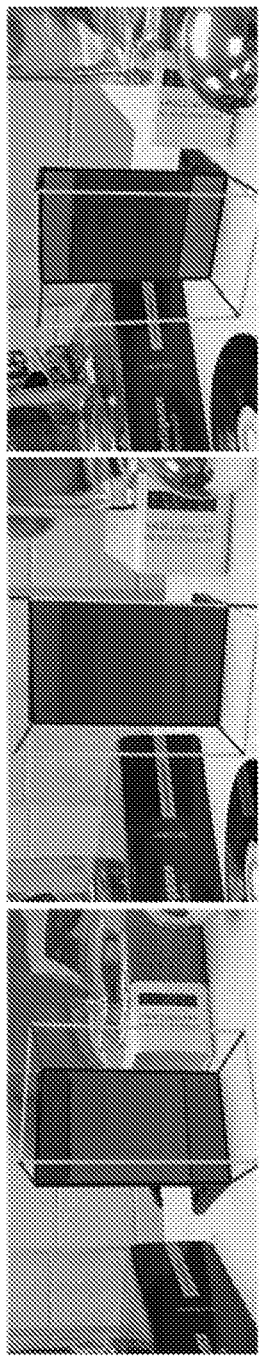

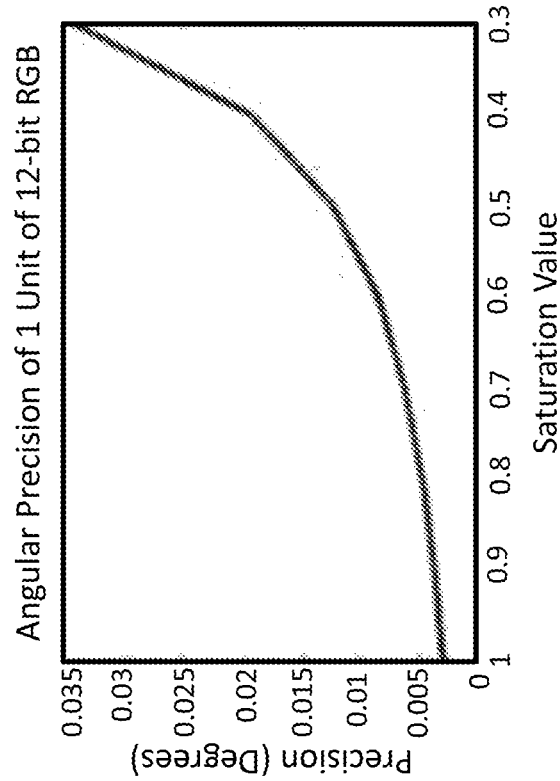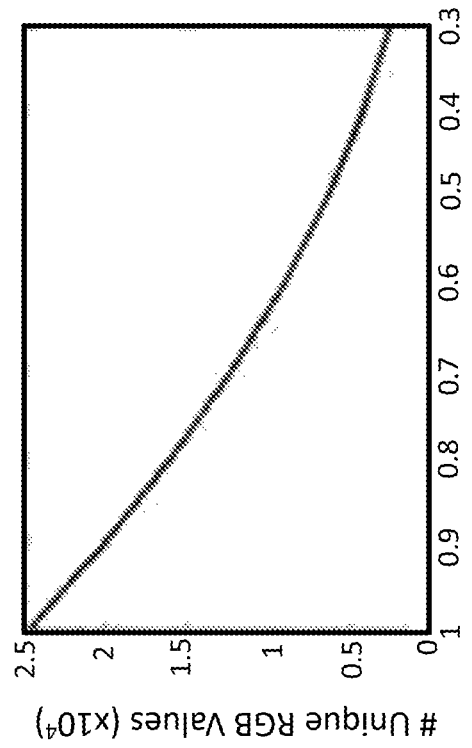
FIG. 25A
FIG. 25B

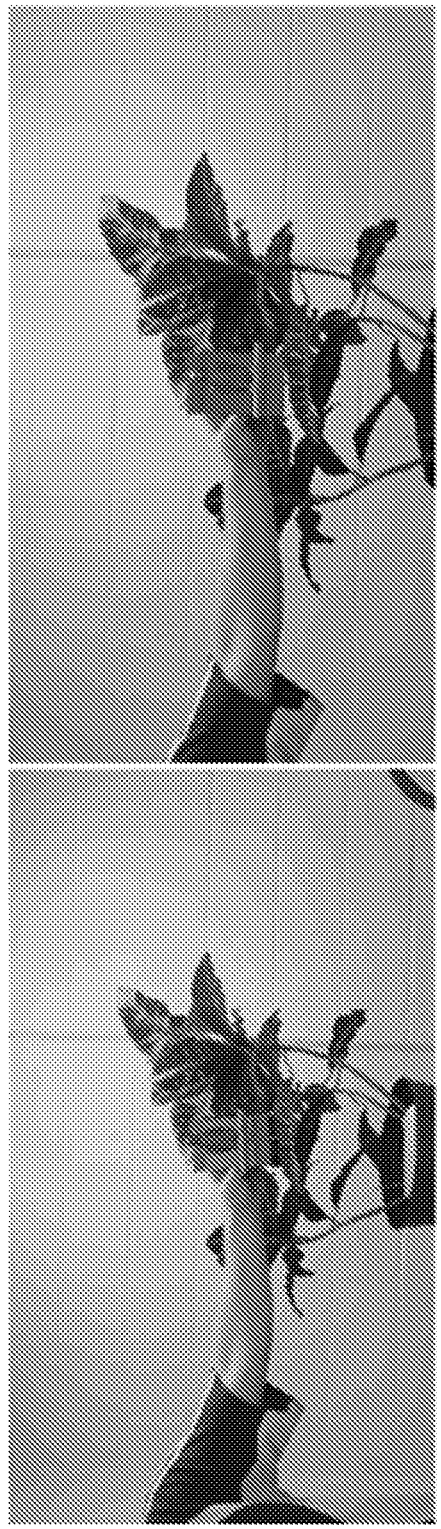

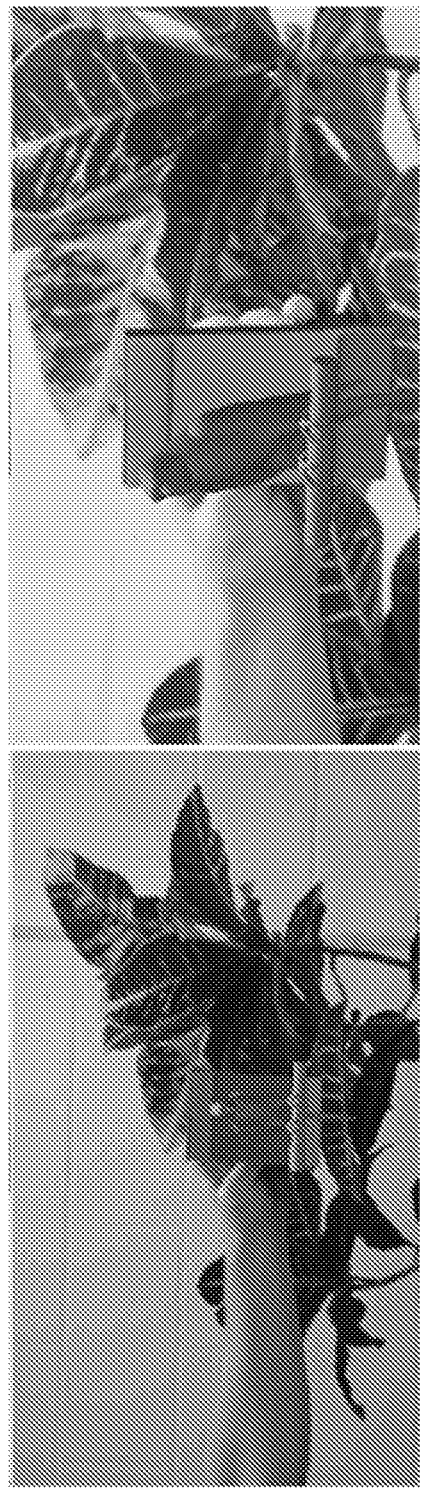

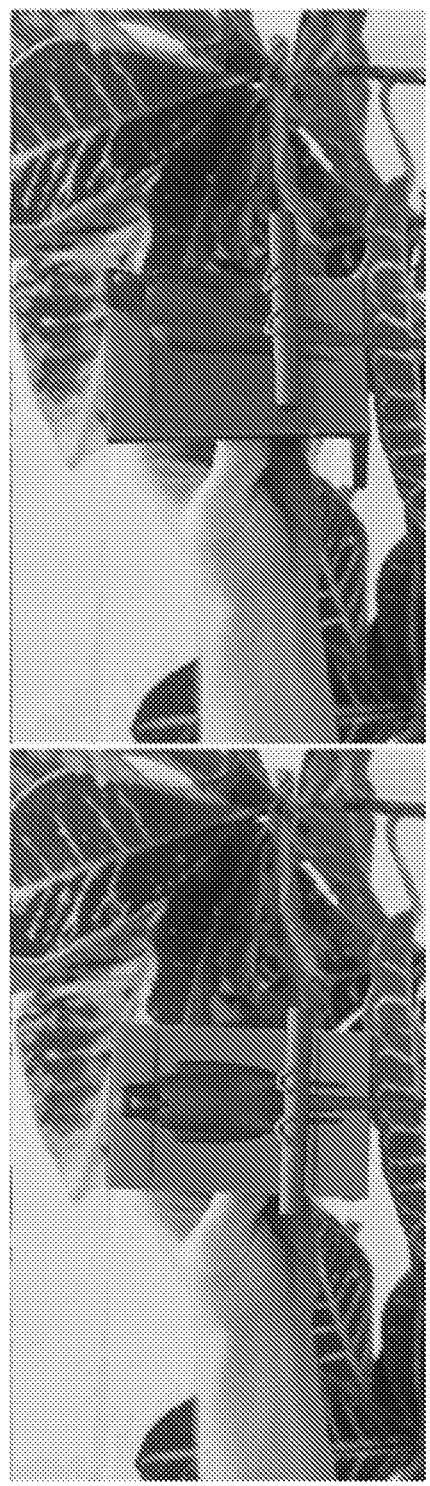

US 10,455,138 B2

CAMERA CALIBRATION WITH LENTICULAR ARRAYS

CROSS-REFERENCE TO RELATED APPLICATION

This application claims priority benefit of U.S. Provisional Application Ser. No. 62/150,028, filed on Apr. 20, 2015, the entire content of which is incorporated herein by reference.

STATEMENT REGARDING FEDERALLY SPONSORED RESEARCH & DEVELOPMENT

This invention was made with government support under IIA1355406, awarded by National Science Foundation. The government has certain rights in the invention.

FIELD OF THE DISCLOSURE

The field of the disclosure relates generally to camera calibration and, more specifically, to calibration without correspondence from a structured light field.

BACKGROUND OF THE DISCLOSURE

Camera calibration defines the relationship between an image and the scene that the image depicts. Calibration characterizes the photometric and geometric properties of the camera, that define, respectively how pixels of the camera report color and intensity of the scene, and where scene elements appear on the image.

Most common calibration approaches start with an image of an object with known 3-D geometry, or several images of an object with known 2-D geometry, find correspondences between points on the object and points in the image, and use these to solve for the camera geometry.

There are some approaches that are not based on identifying exact corresponding points in a scene. Calibration patterns that consist of patches of parallel lines can be used for intrinsic camera calibration and extrinsic calibration (including rotation and translation relative to other cameras). Approaches that do not require correspondence between specific lines are based on seeing the orientation and spacing of those parallel lines on the image and include those based on the prismatic line constraint, and an approach using the Radon transform as a filtering operator. In some circumstances, there are scenes that have large numbers of parallel lines with a known orientation, such as vertical edges of buildings or plumb-lines; the orientation and position of those lines in an image provide constraints for both intrinsic and extrinsic calibration even without matching the pixel to a specific line in the world.

Other approaches use textures for calibration which assumes that natural urban textures have low rank (for example, grids of windows on the exterior of a building). Using this assumption, calibration and lens distortion that minimizes the rank of the textures in the image, using all pixels, not just point locations of geometric points is solved for.

BRIEF DESCRIPTION OF THE DISCLOSURE

In one embodiment of the present disclosure, a method of calibrating a camera is disclosed. The method comprises creating a light field with a lenticular array; and, using a single picture of the light field to calibrate the camera.

In another embodiment of the present disclosure, a method of creating a light field is disclosed. The method comprises using a calibration object, wherein the calibration object is based on a lenticular array comprising at least one sheet; and, focusing light onto a back side of the at least one sheet to create the light field.

In yet another embodiment of the present disclosure, a method of calibrating a camera for an augmented reality application is disclosed. The method comprises using a calibration object to create a color-coded light field, wherein the calibration object is based on at least one lenticular array; estimating a focal length of the camera and a relative orientation and position of the object from a single image; and, calibrating the camera.

BRIEF DESCRIPTION OF THE DRAWINGS

FIGS. 11A-11D depict views of lenticular arrays in accordance with the present disclosure.

FIGS. 13A-13C depict various hue measurements in accordance with the present disclosure.

FIGS. 18A-18H depict exemplary embodiments of single frame estimations of the focal length and object rotation estimates in accordance with the present disclosure.

FIGS. 21A-21I depict exemplary embodiments of focal length estimation results in three frames of a video over a calibration object in accordance with the present disclosure.

FIGS. 25A and 25B depict exemplary embodiments of RGB measurements in accordance with the present disclosure.

FIGS. 26A-26F depict exemplary embodiments of focal length, rotation and translation estimates in accordance with the present disclosure.

DETAILED DESCRIPTION OF THE DISCLOSURE

Figure 1A:
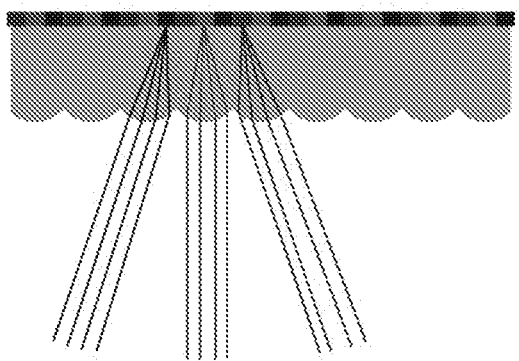
FIGS. 1A-1D are exemplary embodiments of a lenticular array consisting of a set of cylindrical lenses designed to focus parallel light rays onto a back-plane in accordance with the present disclosure.
Figure 1B:
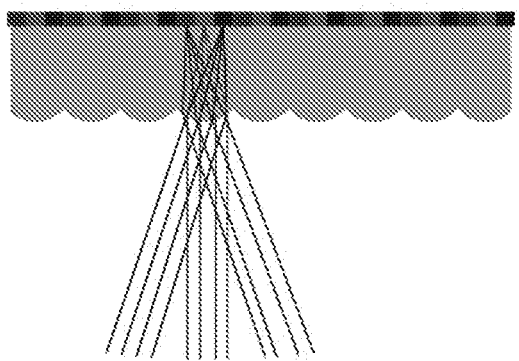
Figure 1C:
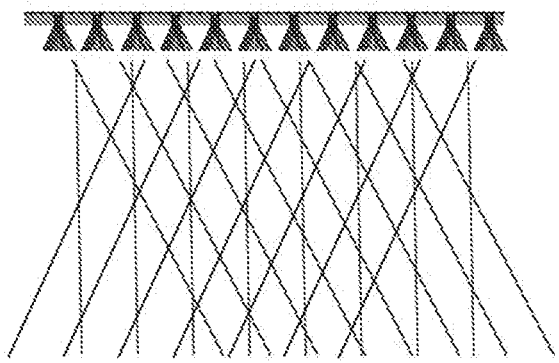
Figure 1D:
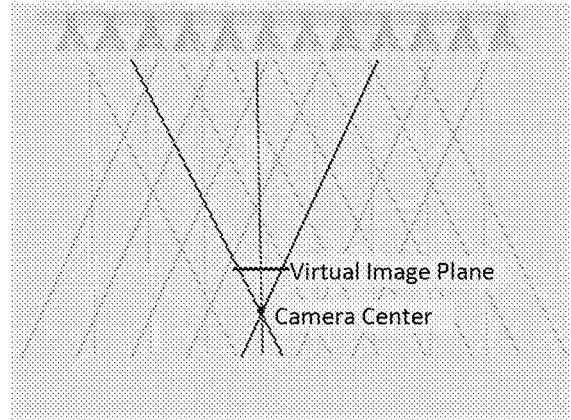

The present disclosure is directed to an approach to solve camera calibration from a single picture of a simply structured light field created by viewing a carefully designed lenticular sheet. The lenticular sheet has different colors visible at different locations and gives linear constraints on the $K^{-1}R$ matrix which can be decomposed to give the rotation and calibration. The pixel locations that are measured are linear and the hue does not require a correspondence between the image and a point on the calibration pattern. Sensitivity to noise, the design of a lenticular calibration sheet, and experimental results from a physical prototype pattern were studied.

In some embodiments, this approach to partial geometric calibration of a camera uses a passive calibration object that creates a specially structured light field. In some embodiments, the calibration object is based on a lenticular array. These are sheets of plastic which are comprised of a large set of parallel cylindrical lenses. These lenses focus light onto the back of the plastic sheet. For example, common children's toys exploit this by interleaving multiple pictures behind the lenticular array so that the apparent pattern changes as the array is rotated. In another example, some modern televisions (TVs) use a lenticular layer in order to show different pictures in different directions in order to project 3-D TV "without any glasses."

In some embodiments, a method of calibrating a camera is disclosed. The method comprises creating a light field with a lenticular array; and, using a single picture of the light field to calibrate the camera. In some embodiments, the camera is calibrated without any correspondence from a structured light field.

In some embodiments, the lenticular array comprises at least one sheet. In some embodiments, the at least one sheet comprises a plurality of colors. In some embodiments, the plurality of colors are visible at a plurality of locations on the sheet. In some embodiments, the sheet comprises plastic. Further, in some embodiments, the at least one sheet comprises a plurality of parallel cylindrical lenses.

In another embodiment, a method of creating a light field is disclosed. The method comprises using a calibration object, wherein the calibration object is based on a lenticular array comprising at least one sheet; and, focusing light onto a back side of the at least one sheet to create the light field. In some embodiments, the light field is not a structured light field. In some embodiments, a plurality of lenses focuses the light onto the back side of the at least one sheet.

In some embodiments, not only is the camera calibrated but the light field also is used to do pose estimation. In some embodiments, the camera is calibrated without information from a correspondence between a point on an image and a point on a calibration object. In some embodiments, a printed pattern is adhered to the back of a lenticular array and comprises a plurality of interleaved colors. In some embodiments, the plurality of colors are visible at a plurality of orientations relative to the lenticular array.

FIGS. 1A-1D are exemplary embodiments of a lenticular array consisting of a set of cylindrical lenses designed to focus parallel light rays onto a back-plane in accordance with the present disclosure. As shown in FIG. 1A, if this back plane has different colors arranged behind each lens, then the apparent color of the lenticular array changes based on viewing angle. This pattern is repeated at every location of the lenticular array, so each lenticule is viewed as a light source that has a different color projecting in each direction (shown in FIG. 1B). This lenticular array creates a light field structured so that the color of each ray depends on its direction (shown in FIG. 1C). The image from a pinhole camera in this light field will have colors that change across its field of view, and derives simple constraints that allow this image to be used for camera calibration without solving for image correspondences (shown in FIG. 1D). As shown in FIGS. 1A-1D, the interleaved pictures behind each lenticular lens are a color spectrum. This creates a light field where the color of a pixel depends fundamentally on the direction of the ray viewed by that pixel. This is quite different than most imaging situations; for example, in Lambertian scenes, it is the set of rays that come from a single world point that have the same appearance. A camera that captures an image in this light field will see a color pattern that varies across the image.

These images have a beneficial relationship to the parameters of a camera's rotation and intrinsic calibration. Specifically, the more quickly the color changes across the lenticular array in the image, the shorter its focal length. The constraints are only slightly more complicated in a full three dimensional setting, and the contributions of this disclosure are to formally derive those constraints, to give an initial exploration of the sensitivity to noise of these constraints, and to experimentally demonstrate their feasibility with a lenticular calibration object.

The following three points are particularly compelling: (i) lenticular sheets are a cheap commodity item and the appropriate back-plane textures can be printed on commodity printers, so this approach is broadly feasible even in application domains where cost is a factor; (ii) the constraints on the intrinsic parameters and the rotation are linear constraints based only on the pixel location and observed color they do not require correspondence between a pixel and a location on the calibration grid, so it is easy to use all observed pixels as measurements; and, (iii) when a camera is translated within this light field, the images remain exactly the same.

Structured Light Field Patterns Using Lenticular Arrays

Figure 2:
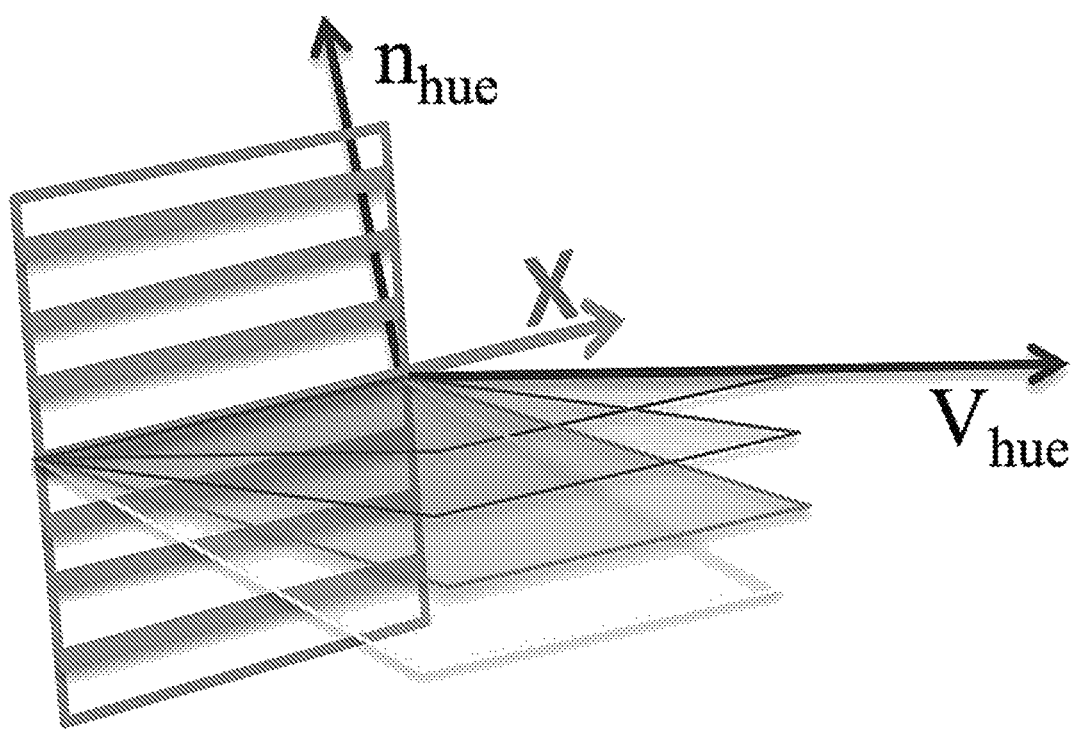
FIG. 2 is an exemplary embodiment of a notation in a coordinate system of a lenticular patch where x is the direction of the dominant axis, $V_{hue}$ is a ray seen for each hue, and $n_{hue}$ is the derivations in accordance with the present disclosure.

In some embodiments, a structured light field based on a lenticular array with a back-plane pattern that varies in hue is defined. This leads to an object whose apparent color smoothly varies as it is rotated. The observed hue depends on how far the viewing angle is rotated around the dominant axis of the lenticular array. FIG. 2 describes a notation that is used, in the coordinate system of the lenticular patch x is the direction of dominant axis, $V_{hue}$ is an exemplary ray observed at a given color and $n_{hue}=V_{hue} \times x$ is the surface normal to the plane containing all rays of that color.

At shallow viewing angles, the mapping between the hue and the viewing angle is more likely to be incorrect because the lenticular lenses no longer focus rays perfectly and there is more likely to be specular reflections off the surface of the lens. In making small fiducial markers from lenticular patches, it is described how to experimentally calibrate a physical prototype to solve for the $V_{hue}$ and $n_{hue}$ that correspond to a given color, and characterize the set of angles where the hue to direction mapping is consistent.

Derivation of Calibration Constraints from Lenticular Patterns

In some embodiments, a pinhole camera views a lenticular pattern. The rotation of that lenticular pattern relative to the camera is R, and the calibration matrix of the camera is K. The basic constraint is that a ray observing a hue must be perpendicular to $n_{hue}$. In the coordinate system of the camera, a pixel $\vec{\rho}$ captures light traveling along a ray r that depends on the calibration matrix K as:

$$\vec{r} = K^{-1}\rho \quad \text{Equation 1.0}$$

In the coordinate system of the lenticular pattern, this ray is $RK^{-1}\rho$, so when observing a particular hue, it must satisfy the constraint:

$$(RK^{-1}\rho) \cdot \vec{n}_{hue} = 0. \quad \text{Equation 1.1}$$

This dot-product is written in matrix notation, $$(RK^{-1}\rho)^T \vec{n}_{hue} = 0, \quad \text{Equation 1.2}$$

rewrite the transpose to get $$\rho^T K^{-1T} R^T \vec{n}_{hue} = 0. \quad \text{Equation 1.3}$$

collect terms to get $$\rho^T (K^{-1T} R^T) \vec{n}_{hue} = 0. \quad \text{Equation 1.4}$$

and rewrite the center matrix as:

$$\rho^T (RK^{-1})^T \vec{n}_{hue} = 0 \quad \text{Equation 2.0}$$

In this equation, p is a pixel location and $\vec{n}_{hue}$ is a vector constraint because the lenticular pattern is a particular hue only when viewed from some directions. M is the combination of the unknown calibration and rotation so $M=(RK^{-1})^T$. If considering measuring the hue at many pixels, each pixel $\rho_i$ and the constraint from measuring its hue $\vec{n}_{hue}$ combine to create a linear constraint on the unknown M:

$$\rho_i^T M \vec{n}_{hue} = 0 \quad \text{Equation 3.0}$$

Given an image, it can measure the hue at many pixel locations, use linear least squares to solve for M, and then use the QR-decomposition to extract the estimates of K and R.

Translation of the lenticular pattern and the position on the lenticular pattern of the observed point appear nowhere in this set of constraints, so it does not require correspondence between the pixels and the calibration pattern. However, if all observed points are from a single lenticular sheet with the same dominant orientation, then the $n_{hue}$ is restricted to lie along pencil of planes (all planes that include the dominant direction x).

Enforcing Simplified Calibration Matrices

In some embodiments, it may be desirable to enforce specific properties on the matrix K, such as a known image center, square pixels, and zero skew (leaving only the focal length unknown). In this case, the only free variables are the focal length f and the rotation which is parameterized with Rodrigues vector ρ. Then, one can solve for these variables minimizing the squared error function, summed over all pixels i:

$$g(f,\beta) = \Sigma_i \| \rho_i^T K(f) R(\beta) \vec{n}_{huei} \|_2^2. \quad \text{Equation 4.0}$$

where K(f) is calibration matrix that has focal length f and assumes that the camera principal point is at the center of the image ($c_x$, $c_y$):

$$K(f) = \begin{pmatrix} f & 0 & cx \\ 0 & f & cy \\ 0 & 0 & 1 \end{pmatrix}, \quad \text{Equation 5.0}$$

and R(p) is the rotation matrix corresponding to the Rodrigues vector ρ.

Single Image Camera Calibration with Lenticular Arrays for Augmented Reality

In another embodiment of the present disclosure, a method of calibrating a camera for an augmented reality application is disclosed. The method comprises using a calibration object to create a color-coded light field, wherein the calibration object is based on at least one lenticular array; estimating a focal length of the camera and a relative orientation and position of the object from a single image; and, calibrating the camera.

Figure 10B:
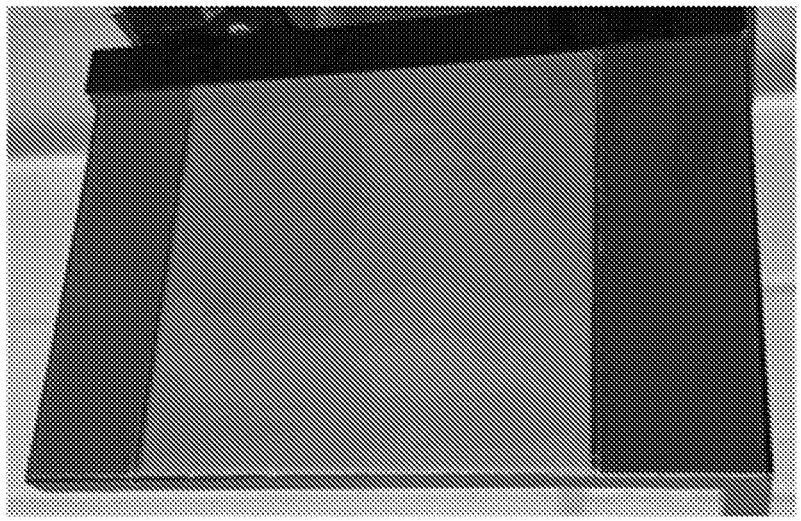
FIGS. 10A and 10B depict an exemplary embodiment of a calibration object made from three lenticular arrays in accordance with the present disclosure.
Figure 10A:
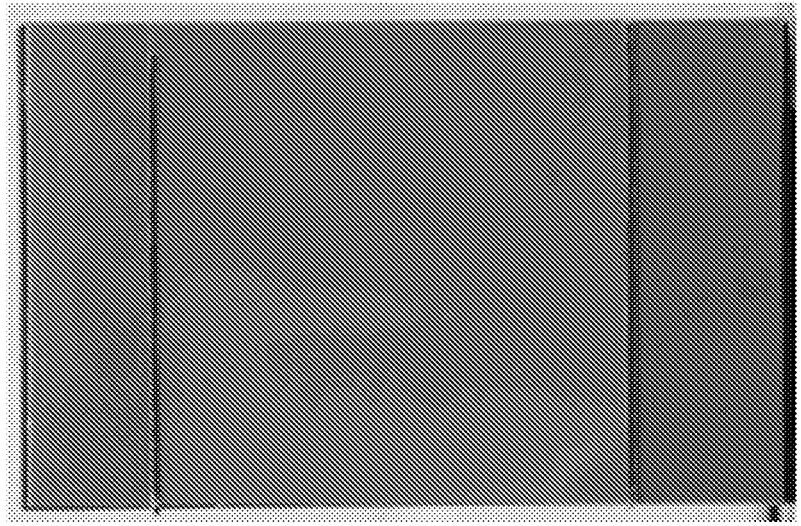

In some embodiments of the present disclosure, an approach to geometric calibration of a camera that requires a single image of a calibration object that may lie within a larger scene is disclosed. An exemplary embodiment of the calibration object is shown in FIGS. 10A and 10B. Each array has an observed color that changes depending on the viewing angle. In FIG. 10A, when viewed from a far distance, the arrays have relatively consistent colors because they are being viewed from approximately the same angle. In FIG. 10B, a wide angle view from a closer distance has significant color variation because the direction from the camera to different parts of the object varies substantially.

This calibration object is based on several lenticular arrays. In some embodiments, a lenticular array is defined as a sheet of plastic which is comprised of many tiny parallel cylindrical lenses. FIGS. 11A-11D depict how these lenses focus parallel rays of light onto an interleaved pattern on the back of the lenticular array. As a result, for different viewpoints, the lenticular array has different appearances.

In some embodiments, a lenticular pattern is constructed based on a pattern of interleaved colors. This creates an apparent hue dependent on the relative incident angle of light rays viewing the lenticular array. For a perspective camera viewing a planar surface, pixels may have differing viewing angle and therefore will measure a different hue. Therefore, as seen in FIGS. 11C and 11D, a camera with a wide field of view would see many different hues, while a camera with a narrow field of view would see fewer hues. This fundamental relationship between a color-coded lenticular array and a camera provides a novel geometric constraint to calibrate a camera.

In accordance with the present disclosure, the inventors have surprisingly been able to: allow lenticular patterns to constrain the camera focal length; created an approach to correct manufacturing problems of alignment and stretching that make relationship between color and angle vary across a lenticular array; and, experimented with a physical instantiation of a prototype calibration object, showing calibration accuracy in different settings and a complete end-to-end augmented reality demonstration with a variable zoom video.

In Augmented Reality (AR), one seeks to render digital content on top of a video feed of a scene to digitally enhance the physical world. In order to properly project digital elements into the video feed, the relative pose of the digital element and the camera must be known, and the camera calibration must be known.

Calibration methods which require multiple images of an object in different poses or calibration objects with substantial variation in all 3 dimensions may not be appropriate for all applications.

As disclosed herein, the approaches calibrate every image independently using a flat calibration object. This object is based on a lenticular pattern. Lenticular arrays and their 2-D counter-part, microlens arrays, give geometric constraints on the incident angle of light rays viewing the arrays. The present disclosure addresses the problem of joint intrinsic and extrinsic camera calibration needed in AR applications where cameras may change their zoom to keep track of an object. Such an approach is necessary to integrate AR with new commercial systems that sell Pan-Tilt-Zoom cameras that automatically track a radio tag, but which do not have encoders on their zoom lenses that tag imagery with the zoom level.

AR Calibration Object

An exemplary calibration object disclosed herein is inspired by the lenticular array used to estimate object rotation. In some embodiments, three lenticular arrays are mounted perpendicular to each other on a plane, where the two flanking arrays have the same orientation, but orthogonal to the middle array. These arrays are orthogonal so that any rotation of the calibration object creates a change; when the object is oriented as shown in FIG. 10A, rotation around the horizontal axis causes the two edge arrays to change color, while rotating around the vertical axis causes the central part to change color. Small black strips are added to make it easier to distinguish the three arrays when they are oriented so that their colors are similar.

Calibrating a Color Coded Lenticular

The relationship of the apparent viewing angle to the observed color depends on the relative angle of the lenticular array, in particular the rotation around the axis of the lenticular lenses. The relationship between this rotation and observed color is captured in the Hue Response Function (HRF), which is a 1-to-1 relationship for incident angles of up to 40 degrees (after which the colors repeat).

Figure 12B:
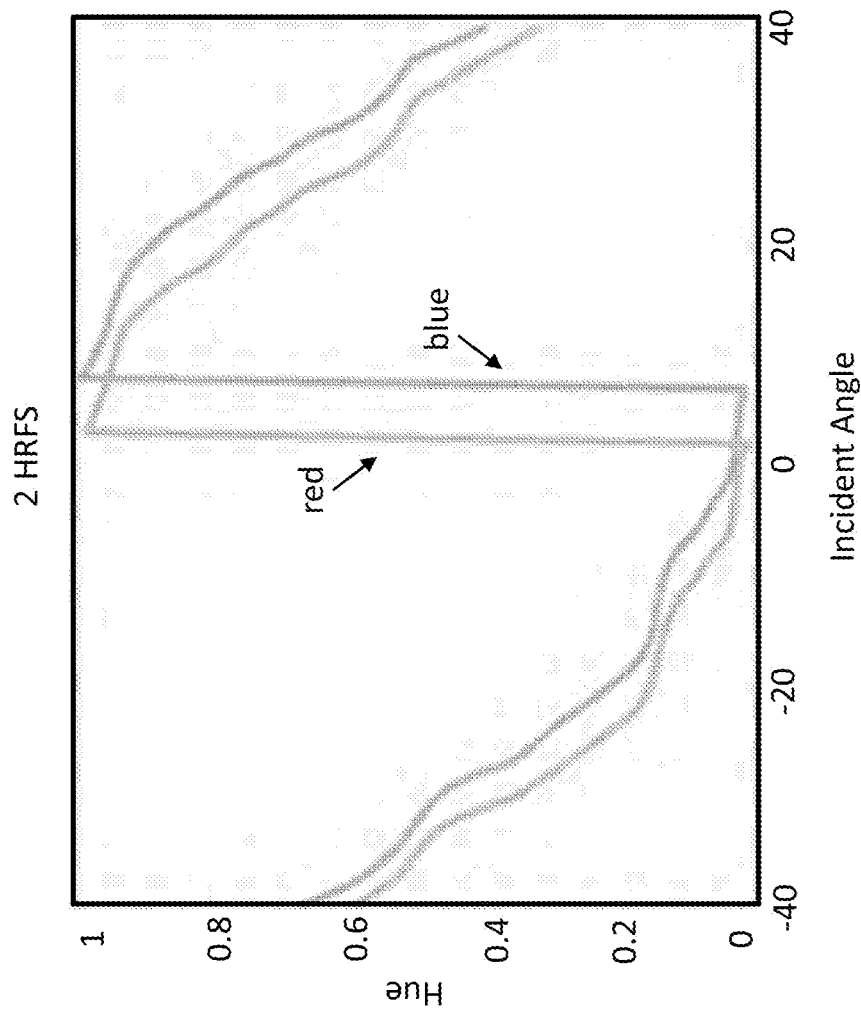
FIG. 12B depicts an exemplary embodiment of observed hue measurement at the yellow circles of FIG. 12A in accordance with the present disclosure.
Figure 12A:
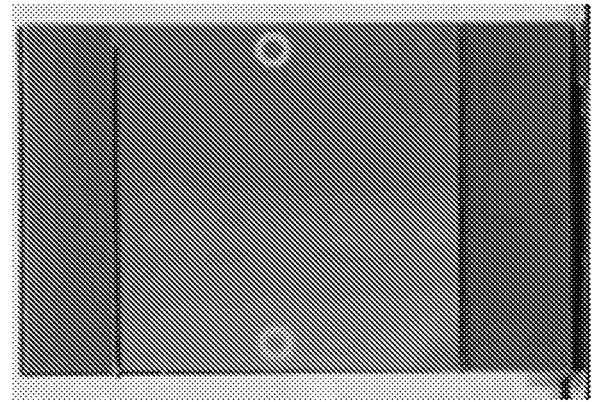
FIG. 12A depicts an image of an exemplary calibration object in accordance with the present disclosure.

For a lenticular array, the hue response function varies across the array. As shown in FIGS. 12A and 12B, a picture of the calibration object taken from far away with a very long focal length lens, gives a field of view of 1 degree. Therefore, the color difference observed at the two circles in FIG. 12A are substantial. When measuring this color difference as the calibration array rotates, a consistent shift is seen. This is due to the challenges of manufacturing and printing the color coded pattern that sits behind each lenticular lens. For this lenticular array that has 2 lenticular lenses per millimeter, if the backplane is stretched about 0.1 mm extra over the course of this array, this causes the observed color shift.

To address this challenge, while still employing standard manufacturing processes for lenticular arrays, the HRF was calibrated, the function that relates hue to orientation, at regular intervals in the local reference frame of the arrays. The corners of the rectangular lenticular arrays were used as anchor points, and for each image a homography was computed mapping the observed lenticular patterns to a canonical coordinate system. The process is illustrated in FIGS. 13A-13C. This calibration object is placed on a controlled rotation mount and rotated through 1 degree increments. For each calibration point, the angle at which that calibration point is viewed was recorded (which may vary across the calibration grid because of perspective effects), and the hue for that angle was measured. The result of this is a curve like those shown in FIG. 12B for each of the calibration points. This process was repeated separately for the center and each of the two side lenticular arrays that make up the calibration object.

The next section derives how images of this calibration object can exploit the measured colors for additional geometric cues to the pose of the calibration object and the focal length of the camera. When converting the observations of the object into geometric constraints, the corners of the array were found to compute the homography, and the colors at these same grid locations were sampled.

Calibration Constraints

Calibration constraints that arise from observing the lenticular calibration object are discussed herein. The overall constraints for the imaging geometry start with a pixel 1) that observes the lenticular array. In the coordinate system of the camera, a pixel 13 captures light traveling along a ray r that depends on the calibration matrix K as defined in Equations 1.0-2.0 discussed above.

In some embodiments, the following optimization to get an initial estimate for R and K by parameterizing K by its focal length f is disclosed:

$$K(f) = \begin{pmatrix} f & 0 & xo \\ 0 & f & yo \\ 0 & 0 & 1 \end{pmatrix},$$

In K(f), pixels are assumed to be square and $x_0$ and $y_0$ are assumed to be the center of the image.

Algorithm

In some embodiments, an algorithm follows the following steps to get an initial estimate of the calibration object pose and camera focal length:

1. Find the four corners of the lenticular calibration object.
2. Solve for the homography to map image coordinates onto object coordinates.
3. Measure the hue at each grid point on the homography, and use these hue measurements to solve for an initial estimate of the rotation and the focal length.
4. Given that rotation and focal length, use lenticular marker based constraints introduced to get an estimate of the object translation.

In some embodiments, the initial estimate is refined by minimizing the following cost function:

$$\underset{p,T,f}{\operatorname{argmin}} \sum_i (h(R(\rho), T, f, i) - hue_i)^2 + \lambda \|g(R(\rho), T, f) - p_i\|_2^2 \quad (3)$$

where the first term penalizes the difference between hue, which is the measured hue at grid-point i (of all lenticular arrays), and h(R(p); T; f i), the hue predicted for grid point i when it is projected onto the image based on camera intrinsic and extrinsic parameters R; T; f, using the HRF function calibrated for grid-point i. Here, R is parameterized via rodrigues parameters. The second term measures the spatial reprojection error between the location pi and the predicted location for that grid point g(R; T; F; i) based on R; T and f. A relative weighting function was found empirically to balance hue and position error which are measured in very different coordinate systems. In all experiments, λ was set to ¼000.

EXAMPLES

The following Examples describe or illustrate various embodiments of the present disclosure. Other embodiments within the scope of the appended claims will be apparent to a skilled artisan considering the specification or practice of the disclosure as described herein. It is intended that the specification, together with the Example, be considered exemplary only, with the scope and spirit of the disclosure being indicated by the claims, which follow the Example.

Example 1—Simulated Camera Calibration

The following shows simulated and empirical results of using lenticular arrays to calibrate a camera. First, the sensitivity of the geometric constraints to noise, number of sample points, and calibration object design were explored. Then, empirical results of a prototype to calibrate for example, an exemplary phone and camera are shown. Next, it is shown that the method also works for out of focus images. Lastly, the optimized rotation and focal length parameters in isolation were explored.

A simulator was created to explore the geometric constraints, allowing to change parameters that control: the amount of noise in the measured hue of a simulated lenticular array; the number of measurements taken from a simulated calibration object; and the orientation and relative positioning of various lenticular arrays that make up a simulated calibration object.

This simulator randomly generated a known position and orientation for the virtual calibration object that is modeled to be 110 mm tall and 70 mm wide. This object can appear anywhere in the field of view of a virtual camera from 150 to 850 mm away. In addition, the virtual calibration object cannot be rotated more than 30° around any of its axes. With a randomly generated position and orientation, the simulator projected the object from a camera's 3-D space onto an image plane. The pinhole geometry was a 1/3.2" format image sensor at a default 4.1 mm focal length. This image was used to optimize the measured geometric constraints to get a rotation and focal length estimation. These estimations were compared against the true simulated conditions to gauge the performance of the derived geometric constraints.

Sensitivity to Noise

The only measurement of the calibration system was the hue observed from the lenticular array at a given pixel location. Therefore, a source of error could be in measuring an incorrect hue. In terms of geometric constraints in previous sections, this error manifested as an improper direction of $\vec{v}_{hue}$, and thus $\vec{n}_{hue}$. Therefore, to simulate the geometric effects of measurement noise, normally distributed aberrations to the direction of $\vec{v}_{hue}$ were introduced. These aberrations were created by randomly choosing a 3-D vector from a Gaussian distribution with a given standard deviation, adding that vector to $\vec{v}_{hue}$, and re-normalizing to again get a unit vector.

Figure 3A:
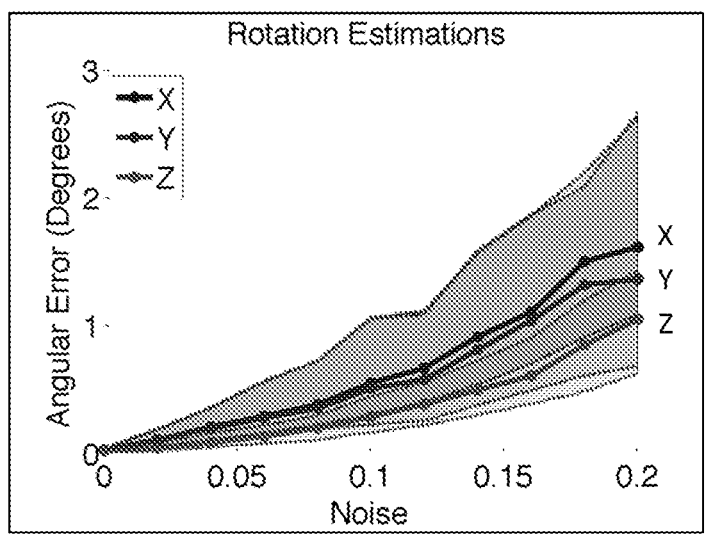
FIG. 3A is an exemplary embodiment of a function of the amount of noise showing sensitivity to noise in rotation estimation for all axes in accordance with the present disclosure.
Figure 3B:
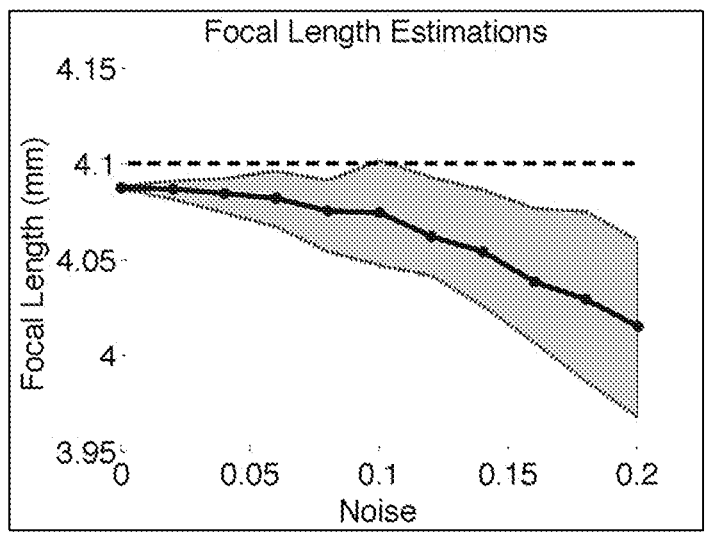
FIG. 3B is an exemplary embodiment of a function of the amount of noise showing sensitivity to noise in focal length estimation in accordance with the present disclosure.
Figure 3C:
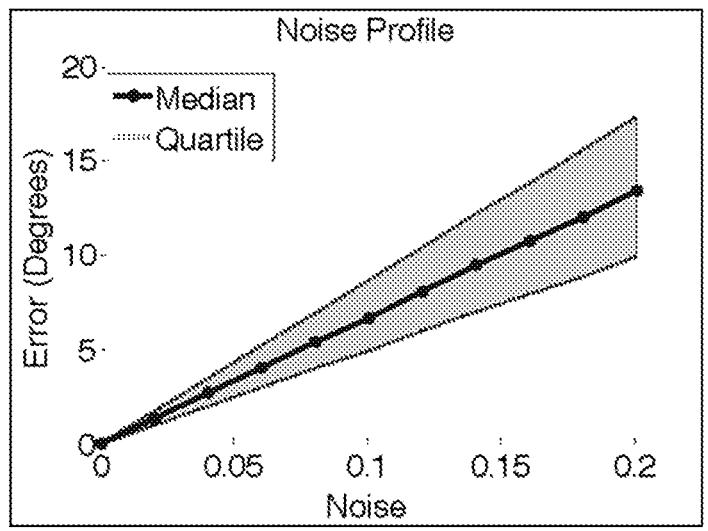
FIG. 3C is an exemplary embodiment of a noise profile showing the quartiles of angular error introduced to $\vec{n}_{hue}$ for a given standard deviation of noise in accordance with the present disclosure.

This example started with zero noise as a baseline and added a maximum of 0.2 standard deviation of noise to the unit vector, FIG. 3C shows the insight into the practical effects of adding noise to $\vec{v}_{hue}$, and then computing $\vec{n}_{hue}$, which showed the angular error in the geometric constraint (the computed direction of $\vec{n}_{hue}$) as a function of the standard deviation of the added noise. The sensitivity to noise in estimation rotation and focal length as a function of the amount of noise is shown in the rest of the FIG. 3.

The 1st, 2nd (median), and 3rd quartiles of the errors in rotation estimation are shown in FIG. 3A. The angular error for each axis of a rotated local reference frame of the calibration object was displayed. The angular error for each axis was measured as the difference (in degrees) of a coplanar ground truth projected axis and the estimated projected axis. For all three axes, the trend has higher median amounts of rotational error with wider distributions for increasing amount of noise. The x and y axes have a small amount of error more than the z axis. That was due to the fact that lenticular arrays are directly measuring rotation around the x and y axes and not around the z axis. Thus, error in rotation around the z axis manifest as error in the angular error of the x and y axes.

The 1st, 2nd (median), and 3rd quartiles of the errors in estimating the focal length are shown in FIG. 3B. With more noise, the distribution of focal error got wider. Perhaps more striking, however, is that with more noise, the focal estimate became smaller. Typically, less than 3 degrees of noise was seen in the $\vec{n}_{hue}$ measurements, which corresponded to a noise standard deviation of 0.05 in this figure. At that noise level, the experiment showed focal length errors of about less than 1% and a rotation error of much less than 1 degree. Even at very high noise levels, the estimated focal length error was 10% of the true focal length and the median estimated rotation has less than 2 degrees of error.

Sensitivity to Number of Measurements

Because this calibration approach does not need point correspondences, it was easy to use a large number of measurements to provide redundancy. Thus, how the number of measurements of the calibration object increased calibration performance was analyzed.

300 trials of randomly generated calibration object posed with 0.08 standard deviation in noise and used an increasing amount of measurements sampled evenly across the calibration object for optimization were ran. The results are shown in FIGS. 4A and 4B.

Figure 4A:
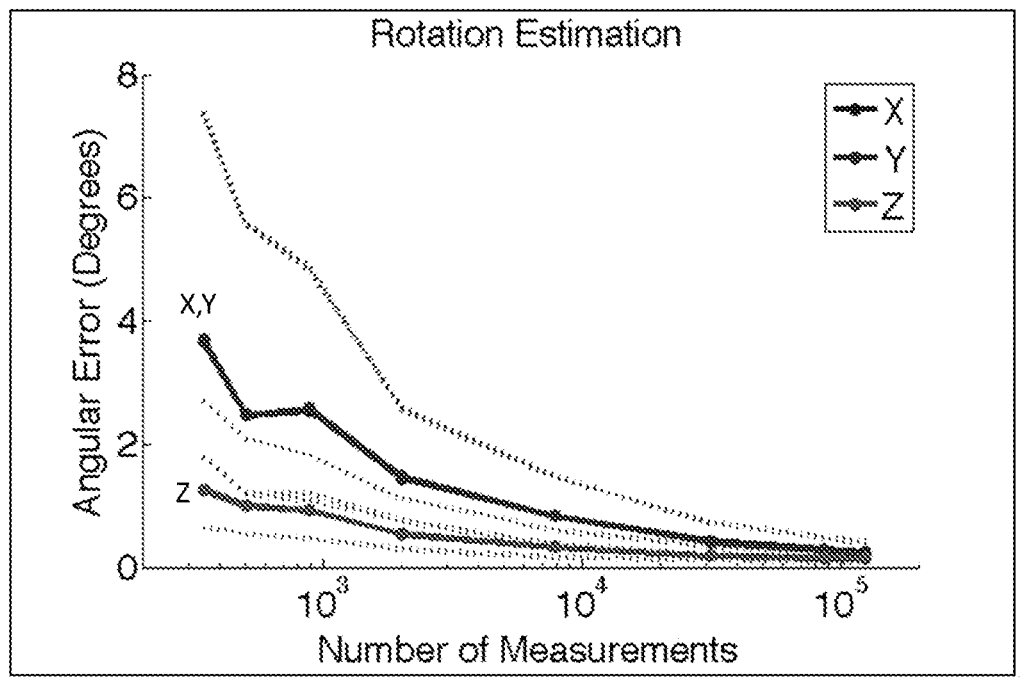
FIG. 4A is an exemplary embodiment of a rotation estimation showing the first, second, and third quartiles of errors in accordance with the present disclosure.
Figure 4B:
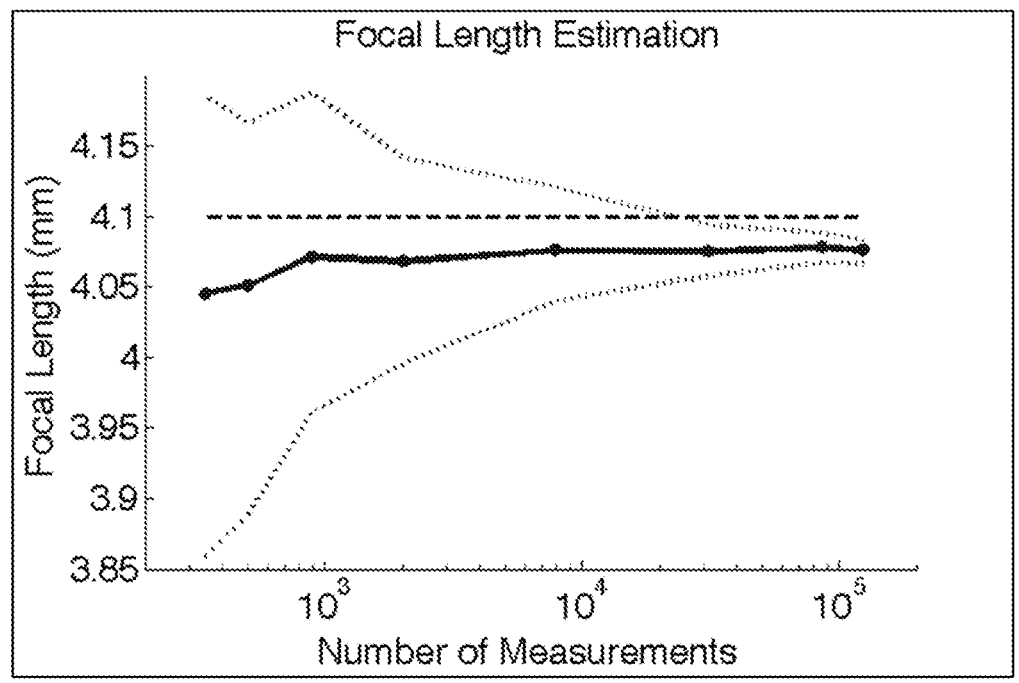
FIG. 4B is an exemplary embodiment of a focal length estimation showing the first, second, and third quartiles of errors in accordance with the present disclosure.

The 1st, 2nd (median), and 3rd quartiles of the errors in rotation estimation are shown in FIG. 4A. As more measurements were used, rotation error reduced and become more narrowly distributed. The number of measurements did not affect the median results for focal estimation, shown in FIG. 4B. However, the estimations became more consistent as more measurements were used in the optimization.

A measurement represented the hue at one pixel of the image. One can get more measurements of the calibration object by having the calibration object fill more of the image bringing it closer or by using a higher resolution camera. For subsequent experiments, about 30 thousand measurements (200×150 pixels) were used, which are feasible to capture with commodity cameras at reasonable distances.

Sensitivity to Orientation and Relative Position of Lenticular Arrays

The constraints created by observing a single lenticular array were not sufficient to solve for the focal length and camera rotation. To get a system of equations for two that is not rank deficient, observations of a lenticular sheet of a different orientation were included. Thus, the calibration object had two lenticular arrays, which had major axes in different directions. Beyond this, there was also the design consideration of relative positioning of the differently oriented lenticular arrays.

How the relative orientation and placement of lenticular sheets affected the estimation accuracy by creating a large set of designs was assessed. Each design is depicted in FIGS. 5A-5G. These show the layout and orientation of the lenticular arrays. For each design, 400 simulations were run that varied position and rotation, the addition of 0.2 standard deviation in appearance noise and 30000 measurements. The estimation error (shown in FIG. 5H) of the rotation around each axis and the focal length (shown in FIG. 5I) were measured.

Figure 5A:
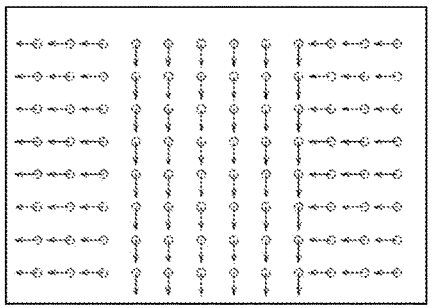
FIGS. 5A-5G are exemplary embodiments of designs created by changing the orientation and positions of the lenticular arrays to make a calibration object in accordance with the present disclosure.
Figure 5B:
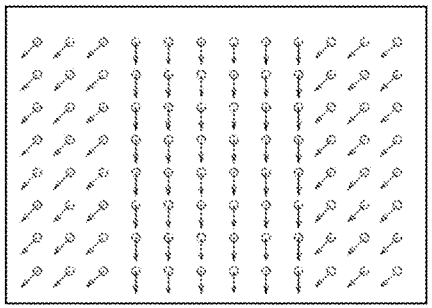
Figure 5C:
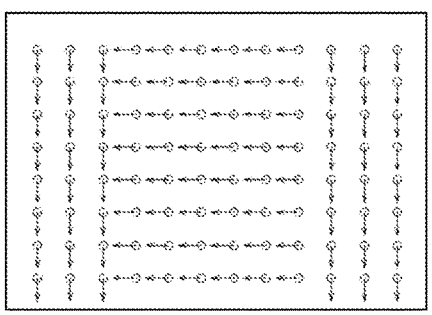
Figure 5D:
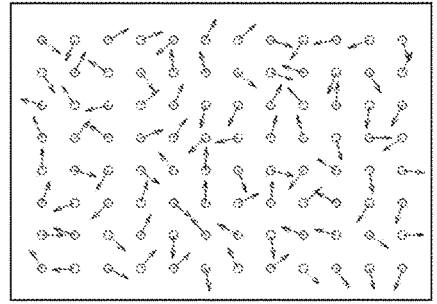
Figure 5E:
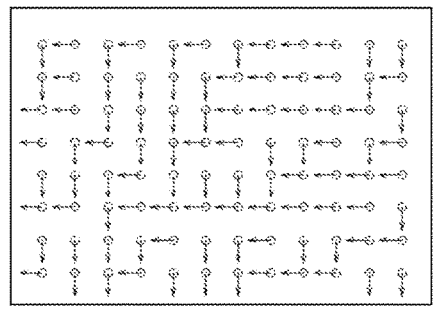
Figure 5F:
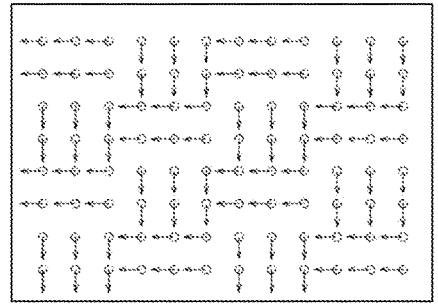
Figure 5G:
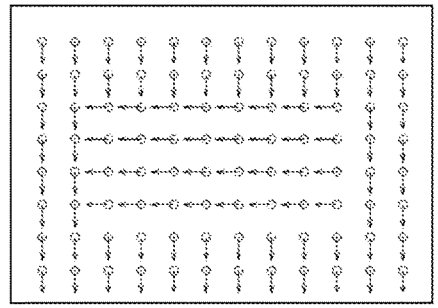
Figure 5H:
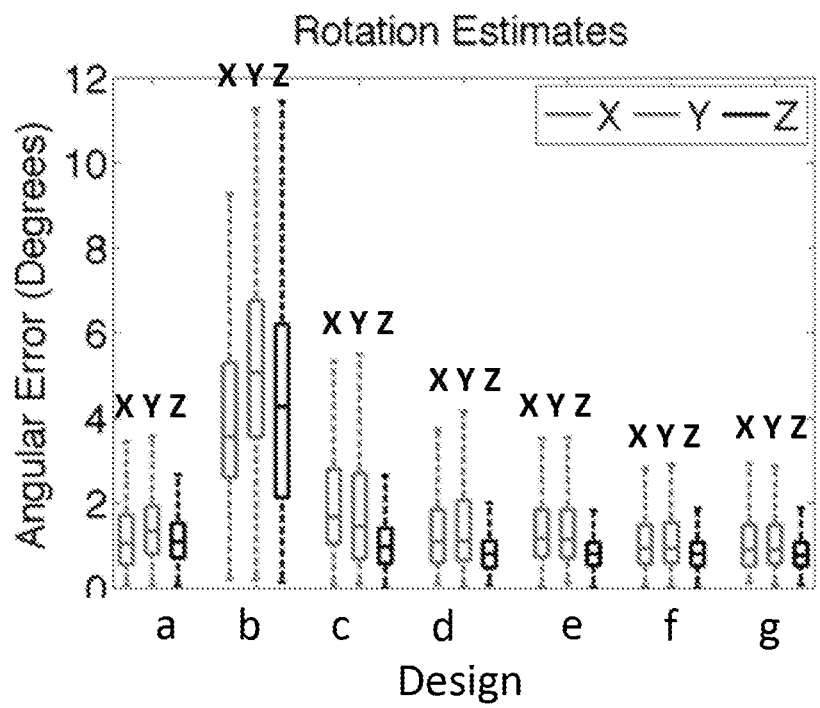
FIG. 5H is an exemplary embodiment of an estimation error of the rotation around each axis in accordance with the present disclosure.
Figure 5I:
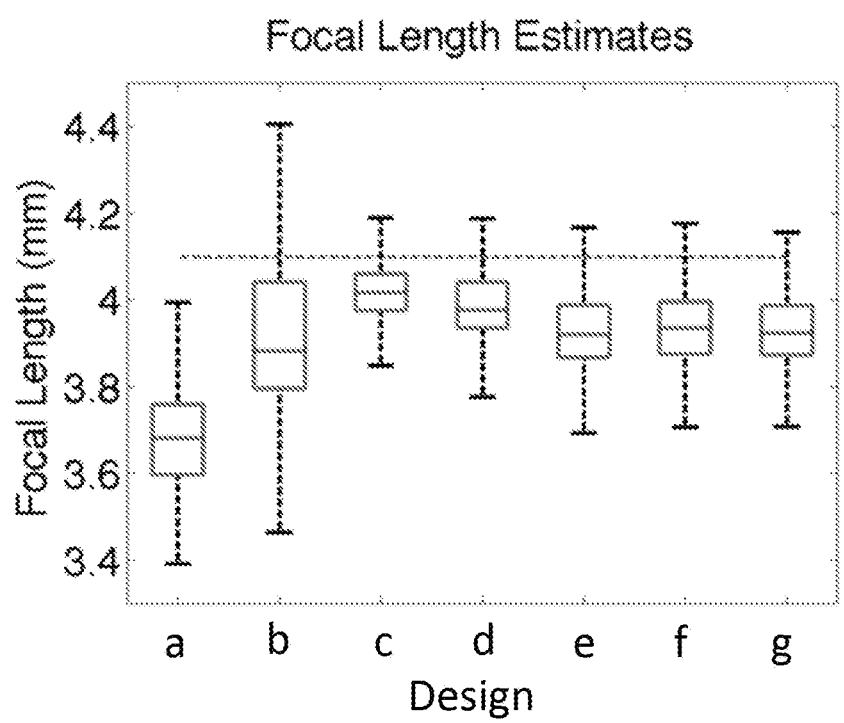
FIG. 5I is an exemplary embodiment of a focal length error in accordance with the present disclosure.
Figure 6B:
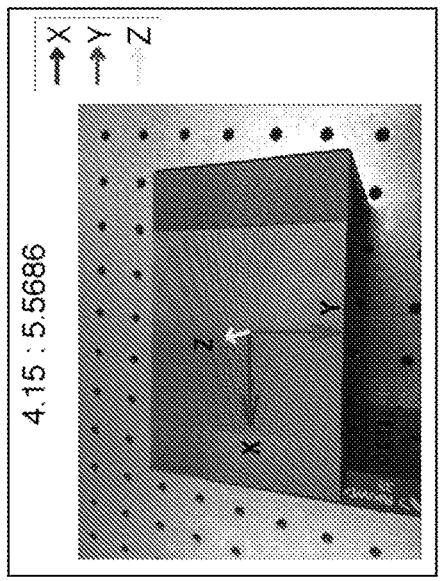
FIGS. 6A-6D are exemplary embodiments of calibrated images at various poses and focal lengths in accordance with the present disclosure.
Figure 6A:
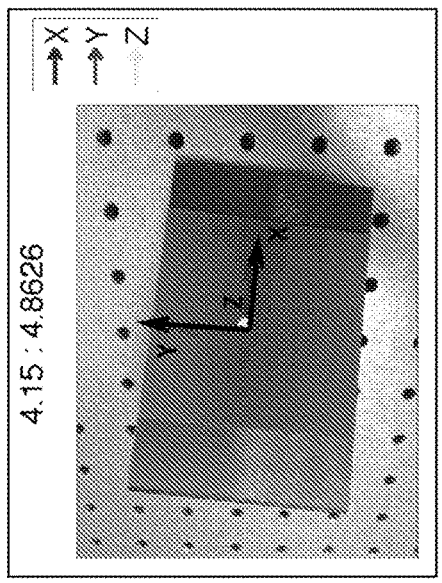
Figure 6D:
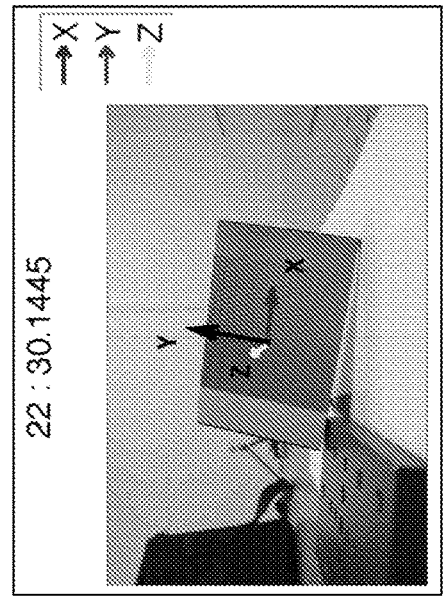
Figure 6C:
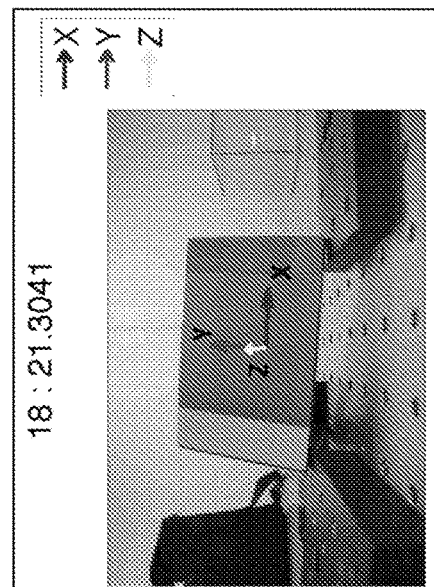

The design in FIG. 5B was the worst in estimating rotation, because the non-orthogonal lenticular orientations gave less complementary cues about rotation angle. Otherwise, most of the patterns are similar in estimating the rotation angle, and the pattern in design shown in FIG. 5C gave the best estimate of the focal length. This might have happened because it has parallel lenticular arrays farthest apart, maximizing the angular difference at which parallel lenticular arrays are viewed and therefore maximizing the hue difference at different parts of the array. This is important because this hue difference at different parts of the array is the primary cue for estimating focal length.

Example 2—Evaluation of Physical Prototype

To test the calibration object in practice, a prototype that was 110 mm tall and 70 mm wide was created. It is comprised of two lenticular arrays, one cut smaller and placed directly on top of the other at a perpendicular orientation.

Camera Calibration

The prototype calibration object was tested with two different cameras. First, the images were calibrated with a camera having a 4.1 mm focal length, such as an exemplary phone, at various orientations. Second, the images were calibrated with an exemplary camera, at various focal lengths. Results are shown in FIGS. 6A-6D. For all of the images, the image shown was used to calibrate the camera, the true and estimated focal length in the title (respectively), as well as the estimated rotation visualized as the local axis of the calibration object.

These results showed rotation estimates that are reasonable, but estimates of the focal length that have up to 40% error. In some images, like FIGS. 6A-6B, direct reflections of overhead fluorescent lights are visible. Systematic errors in the measured hue, caused by reflections or white balance corrections from the cameras are not modeled in the current implementation of the constraints.

Figure 7A:
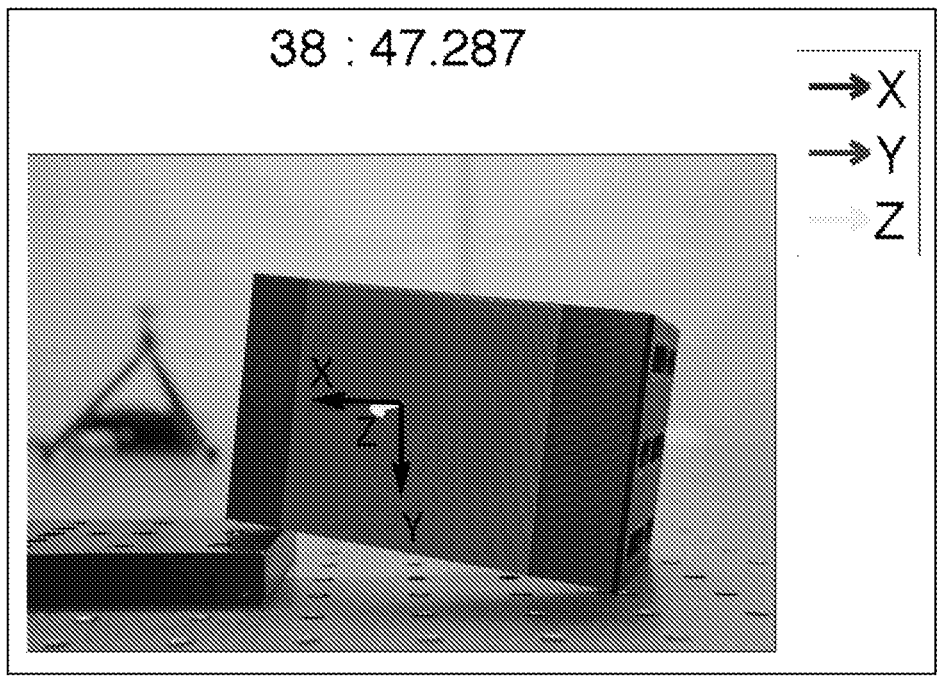
FIGS. 7A and 7B are exemplary embodiments of images taken with long focal length lenses in accordance with the present disclosure.
Figure 7B:
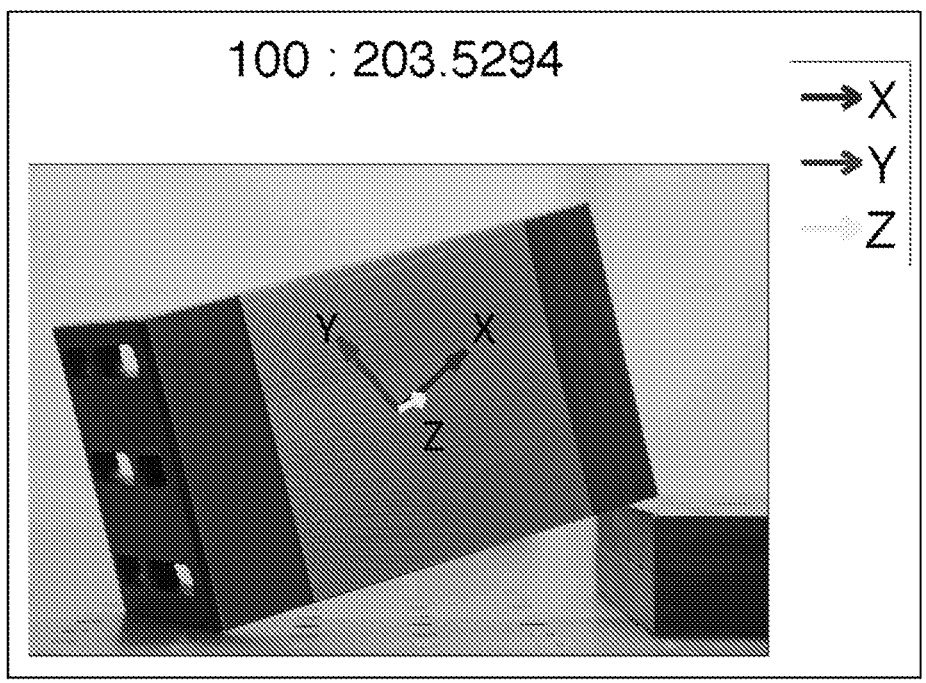

For large focal lengths (images taken with telephoto lenses), the method breaks down because all the rays from the camera view approximately parallel rays, and therefore a lenticular sheet of a particular orientation has the same apparent color. Shown in FIGS. 7A and 7B, are two examples of real pictures taken with long focal length lenses that lead to results where only the surface normal is reasonable.

Calibrating out of Focus Cameras

Using calibration grids requires that all pictures be in focus, to minimize error in locating point correspondences. For close focal lengths, it becomes challenging to keep the entire grid in the depth of field, as a variety of orientations and positions of the grid pattern is needed to achieve strong calibration results. This is not a concern for this system, as it can calibrate using out of focus images.

Figure 8A:
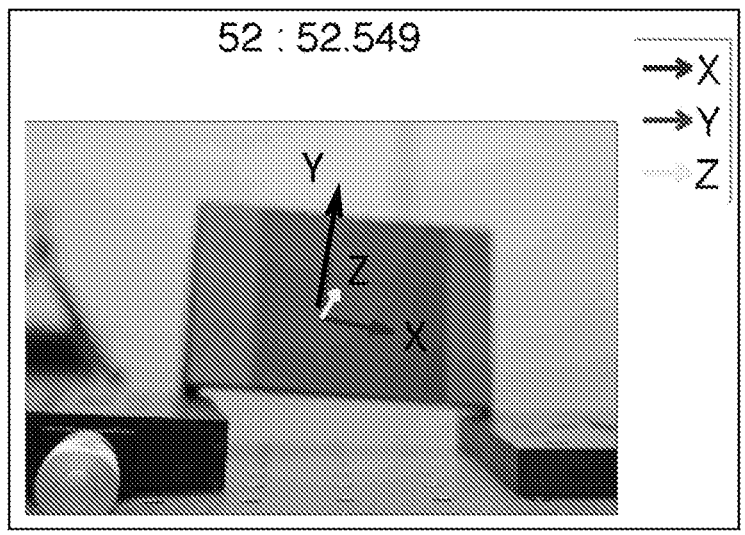
FIG. 8A is an exemplary embodiment of an image showing the focus in front of the calibration object in accordance with the present disclosure.
Figure 8B:
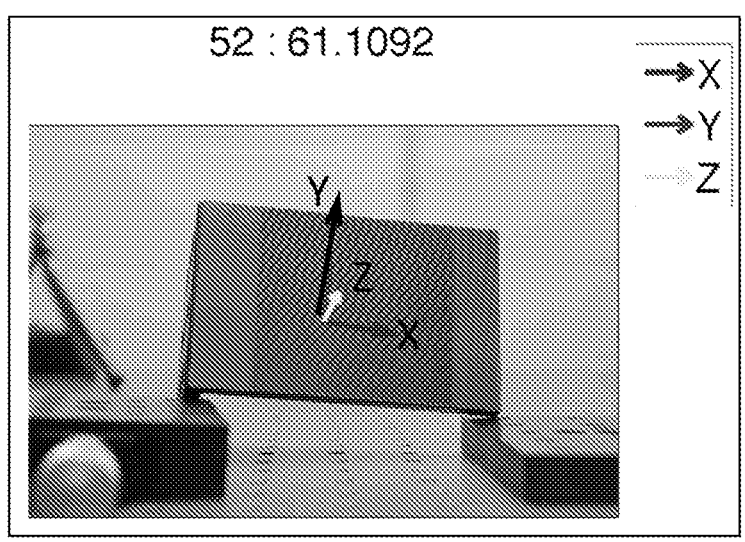
FIG. 8B is an exemplary embodiment of an image showing the focus at the calibration object in accordance with the present disclosure.
Figure 8C:
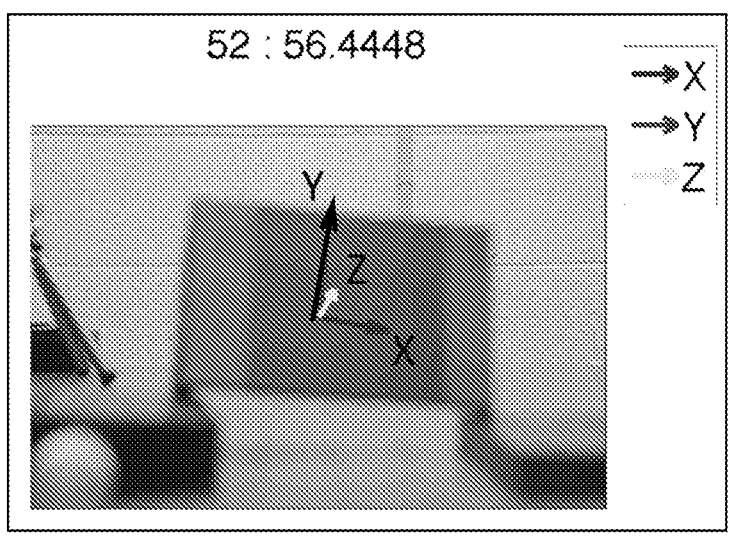
FIG. 8C is an exemplary embodiment of an image showing the focus behind the calibration object in accordance with the present disclosure.

An exemplary camera was used and the results of three images that were focused in front of, at, and beyond the calibration objects are shown in FIGS. 8A-8C. As before, each image is shown with focal length and rotation estimations. For all images, this method was able to estimate the orientation and focal length using the calibration object. In fact, the estimation results were better for the out of focus images. This may be due to the averaging effect of the hue appearance due to blurring. As a result, geometric constraint error was propagated more smoothly across the calibration object, resulting in easier optimization.

Exploring Free Parameters

The relationship between the constraints on focal length and rotation was explored. The same loss function in optimization was used, but a rotation or focal length was provided. Therefore, it can introduce incorrect parameters to see how much one parameter is misestimated when there is an error in the other.

Figure 9A:
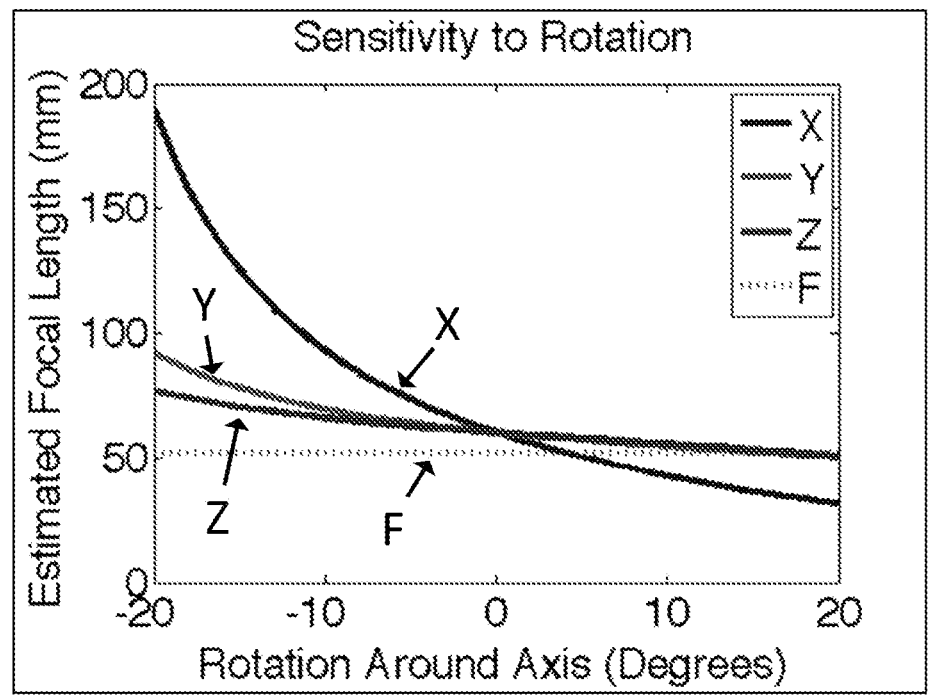
FIG. 9A is an exemplary embodiment of a plot showing the sensitivity to rotation when the focal length estimates as rotations are kept constant in accordance with the present disclosure.
Figure 9B:
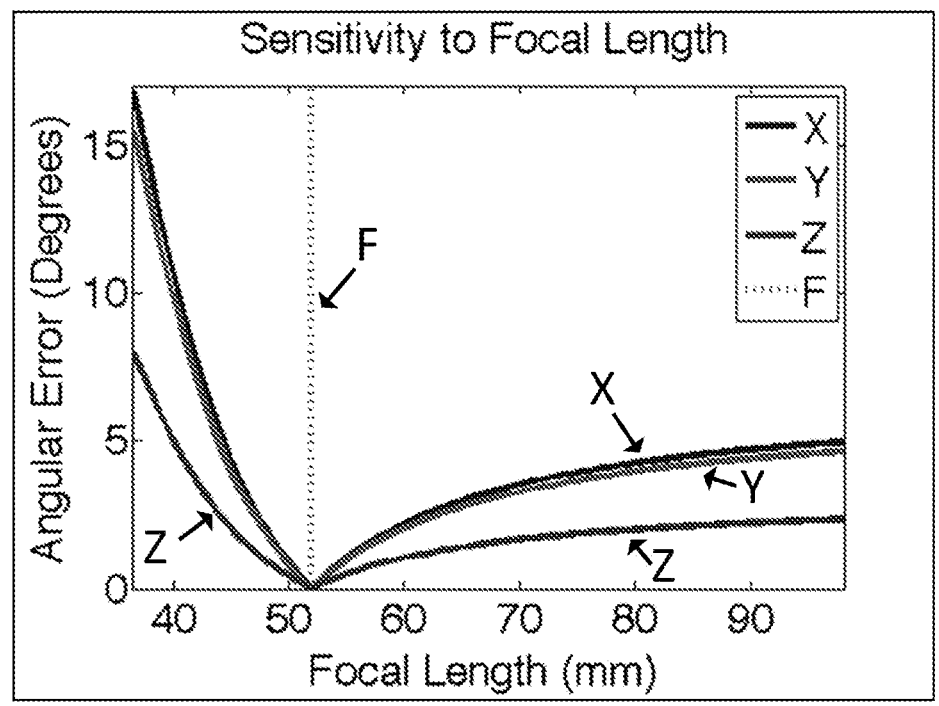
FIG. 9B is an exemplary embodiment of a plot showing the sensitivity to focal length in accordance with the present disclosure.
Figure 9C:
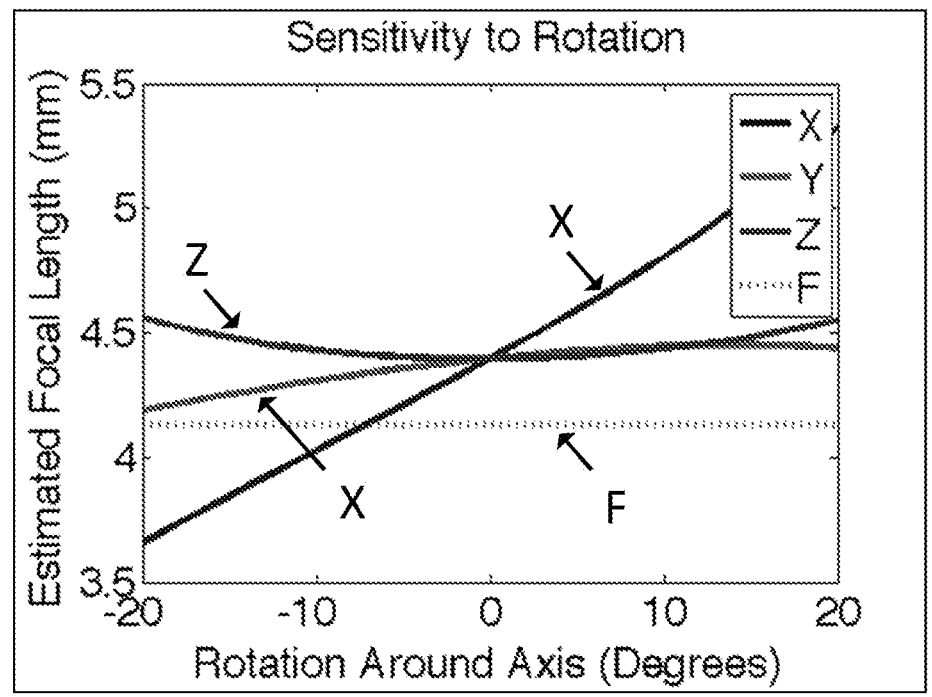
FIG. 9C is an exemplary embodiment of a plot showing the sensitivity to rotation when the focal length estimates as rotations are kept constant in accordance with the present disclosure.

The errors in the focal length estimation when there is error in the rotation around each of the three axes are shown in FIGS. 9A and 9C. For these tests, a ground truth rotation by optimizing constraints with the known focal length of the image was calculated. Then, varying degrees of rotation around the local axes of the calibration object were used to optimize for the focal length.

Figure 9D:
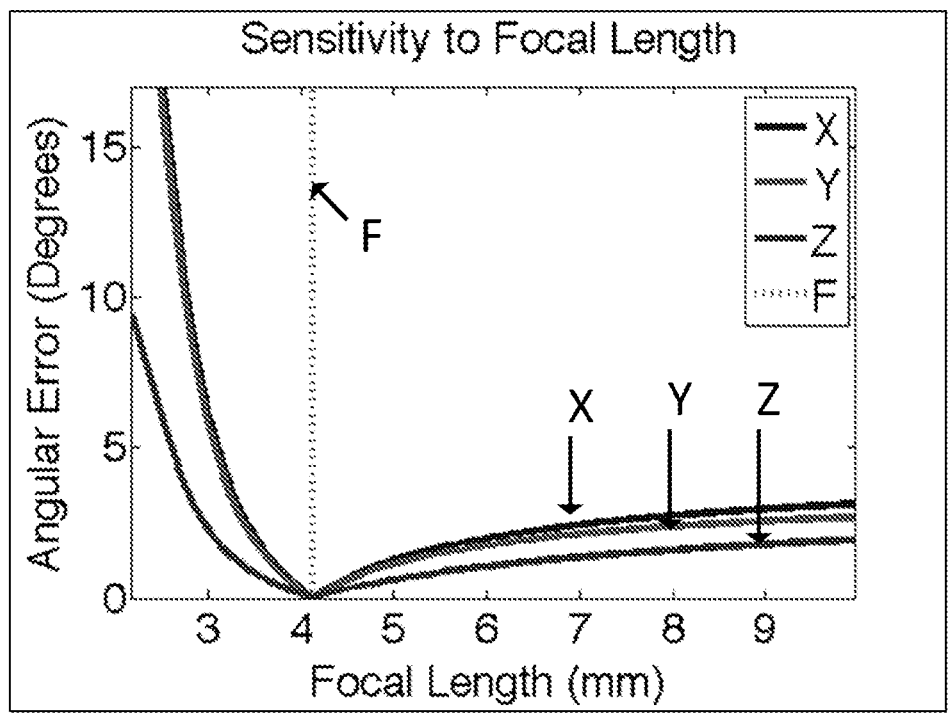
FIG. 9D is an exemplary embodiment of a plot showing the sensitivity to focal length in accordance with the present disclosure.

Similarly, introduced error in the focal length in cases where only optimize for the orientation of the calibration object. The angular error of the rotation estimations as compared to the ground truth rotation are shown in FIGS. 9B and 9D. These error plots are sensitive to both the design and orientation of the calibration pattern.

A new type of calibration objects that uses lenticular arrays to create structured light fields is disclosed herein. This calibration pattern must be comprised of lenticular arrays of different orientations and creating a structured light field where the color of an observed ray relates to its angle. It leads to a set of constraints for camera calibration that are linear and do not require direct correspondence between pixels and specific locations on the calibration object, so it allows calibration to be based on measurements at very large numbers of pixels.

Example 3—Sensitivity to Point Tracking

In this example, the ability of an exemplary algorithm and calibration object to estimate the object pose and camera focal length was examined. The sensitivity of parts of the algorithm to various intermediate processing steps was also explored.

The first stage of the algorithm is tracking the corners of the calibration object. This is a vital step in most AR pose estimation algorithms, but it has additional importance in the algorithm because of modeling and that the HRF that maps color to angle may vary across the calibration object. Thus, the sensitivity of the algorithm to errors in corner tracking was evaluated. Second, the accuracy of an exemplary approach for estimating the focal length of the camera and rotation and translation of the calibration object was evaluated. An error was characterized by using a physical prototype with different cameras and with the calibration object oriented in different directions. Results showed an object added to a video taken with varying focal length, and compared the realism of the added AR object when there wasn't the ability to dynamically estimate the focal length.

Because the lenticular array may not have the same mapping from angle to color everywhere, it is important to know where on the calibration pattern to measure the color in order to look up the correct location-specific HRF. Therefore, this approach may be especially sensitive to estimating the position of the corners of the calibration object. This was evaluated by rotating the lenticular array around the vertical axis in one degree increments from −35 to 35 degrees. For each image, the following steps were undertaken:

1. Determine four anchor points of the lenticular array,
2. Project the lenticular array into the local reference frame via a homography
3. Sample the hue from the grid-points of the local reference frame image.

Figure 22:
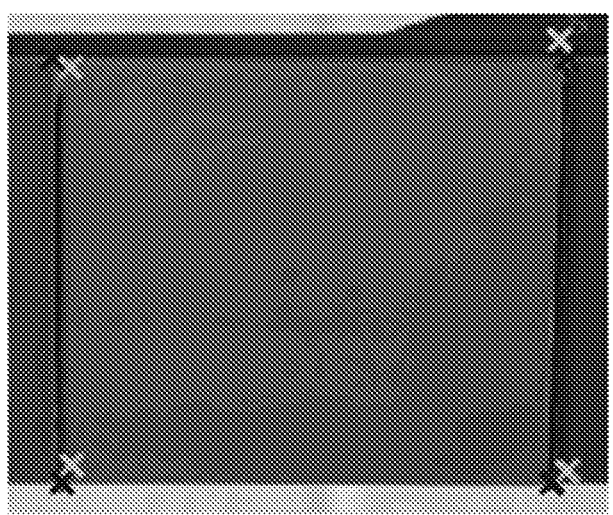
FIG. 22 depicts an exemplary embodiment of an anchor point localization HRF prediction accuracy in accordance with the present disclosure.

For each grid point, the angle at which the point was viewed to the angle predicted by the measured hue was computed. To estimate the effect of noise in estimating the lenticular array corners, the anchor points were perturbed by 8 pixels in random directions 20 times per image and assess the difference in angle predicted by the HRFs. The scale of one such perturbation in the supplementary material is shown in FIG. 22.

Figure 14A:
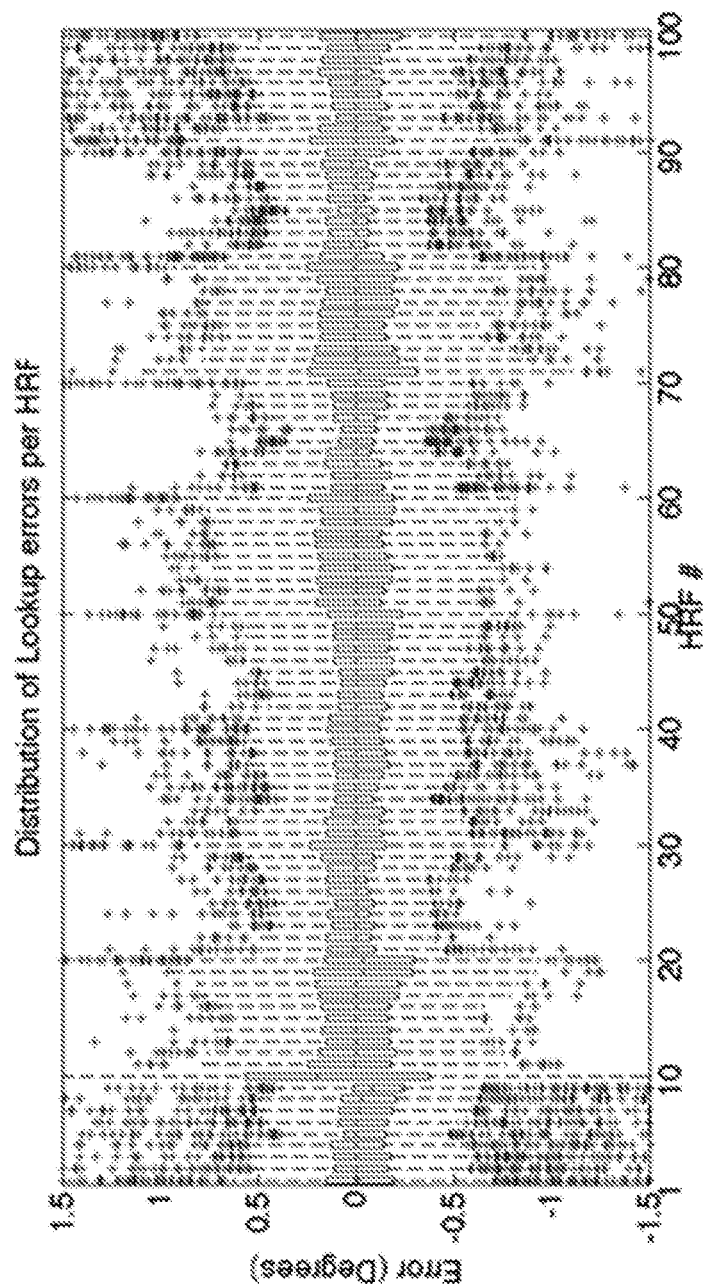
FIGS. 14A and 14B depict exemplary prediction errors in accordance with the present disclosure.
Figure 14B:
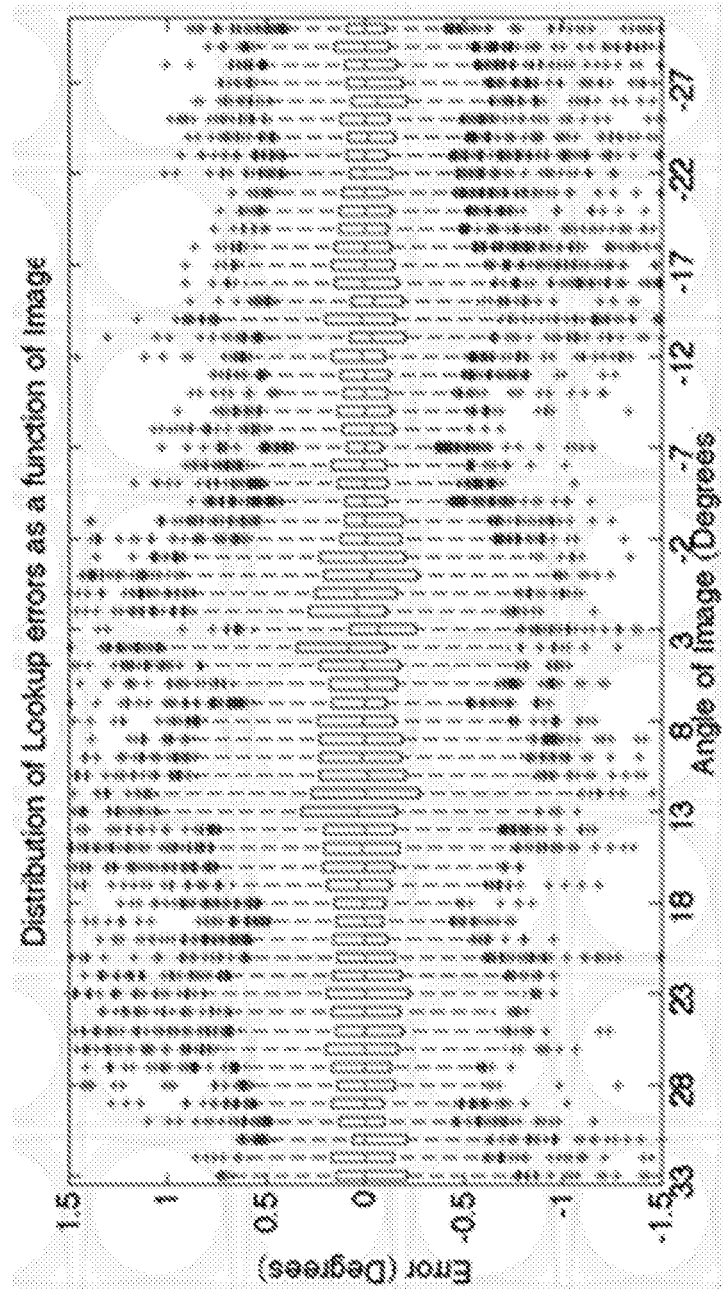

FIGS. 14A and 14B show the results. FIG. 14A shows a box and whisker plot showing the distributions of errors in estimating the angle for each of the 100 grid points where the HRF was calculated. The box in each column shows the 25th and 75th percentiles of the distribution. This experiment shows that modeling the HRF at each location of the lenticular array leads to nearly all angular measurements being within 0.5 degrees of the true incident angle.

The errors in estimating angle from hue were evaluated to depend on the angle at which the calibration object was observed. FIGS. 14A and 14B computed the distribution of errors across the entire array for each image angle. Again, the error is consistently small, even though these statistics are computed using anchor points that were substantially perturbed.

An error of 0.25° is near the limit of a simple geometric constraint based on hue measured at one pixel. The lenticular array shows colors across the hue spectrum over a range of about 40°, so 0.25° is less than 1% of the range of angles that are viewed. Reliably measuring the hue of pixels in 8-bit RGB images to better than 1% precision was also challenging.

Example 4—Pose and Focal Length Estimation

In a laboratory setting, the performance of rotation was assessed along with translation and focal length estimation across different viewpoints. On a motorized stage, the calibration object was rotated in increments of 5 degrees from −25 to 25 degrees around the vertical axis and images were taken at each increment.

Figure 15B:
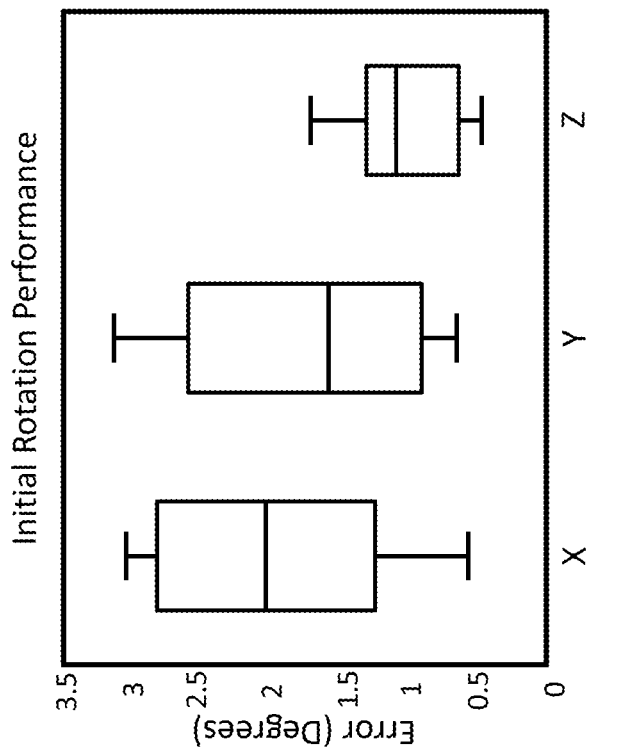
FIGS. 15A-15D depict exemplary rotation estimations and rotation performances in accordance with the present disclosure.
Figure 15A:
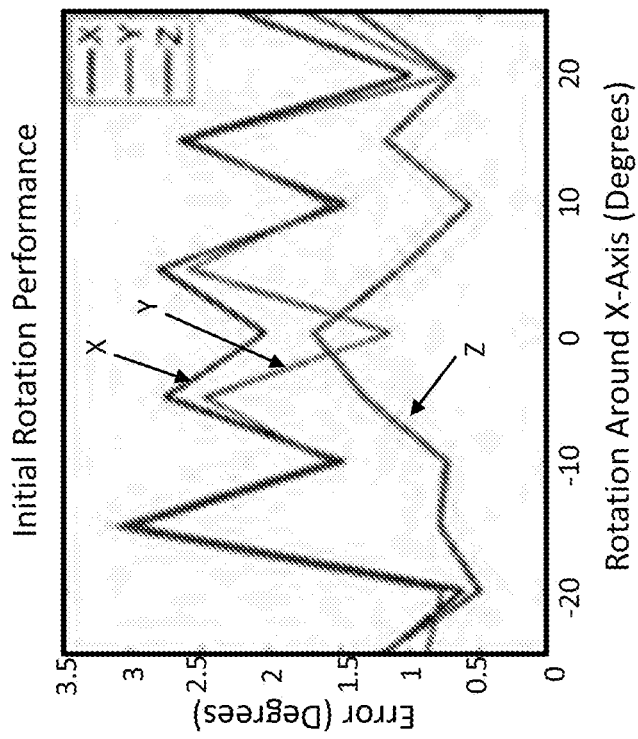
Figure 15D:
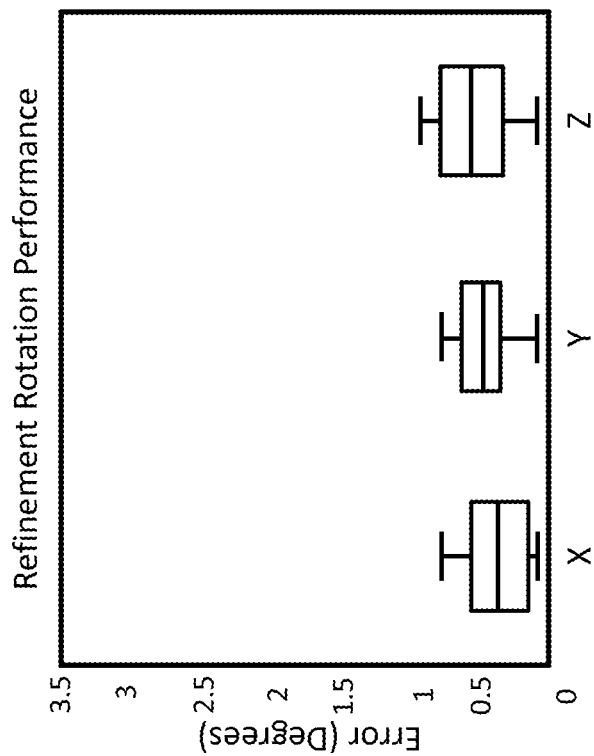
Figure 15C:
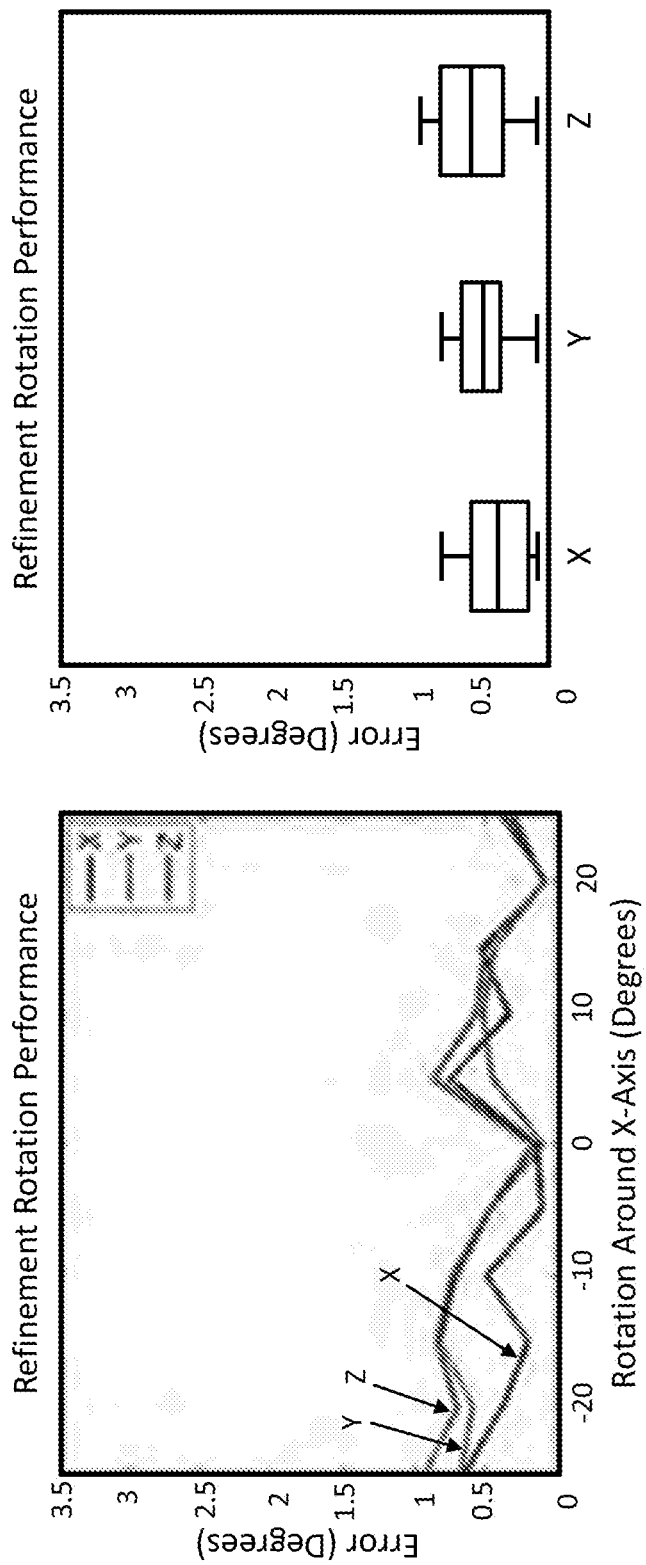

FIGS. 15A-15D show the rotation estimation performance per image in 15A and 15C as well as in summary in 15B and 15D. The rotation error for each local axis is shown as the angular difference of estimates to the true rotation. The estimates from the initialization algorithm are shown in 15B and show errors at the scale of a few degrees. FIG. 15D shows results after minimizing the reprojection error, with rotation estimates with a median error of 1 degree.

Figure 16B:
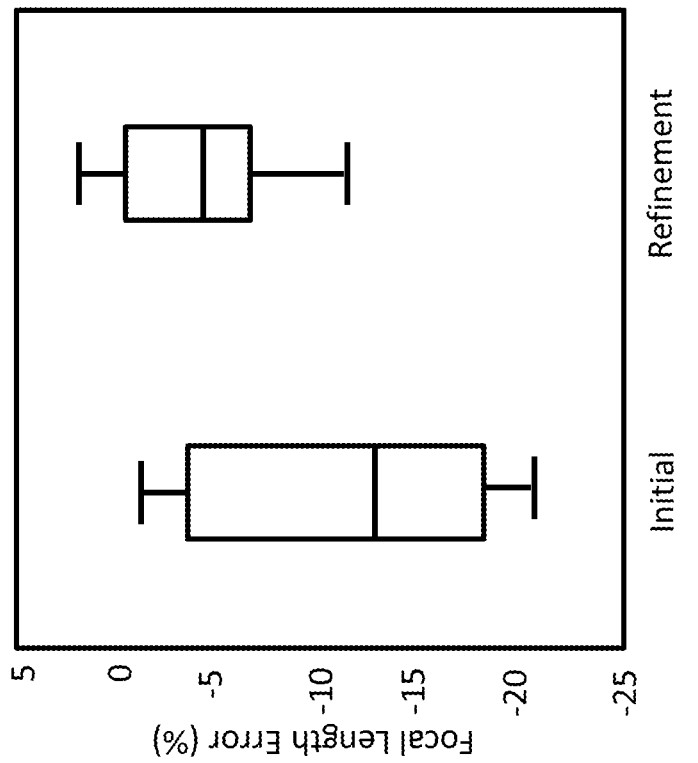
FIGS. 16A and 16B depict exemplary embodiments of focal length estimations and performance in accordance with the present disclosure.
Figure 16A:
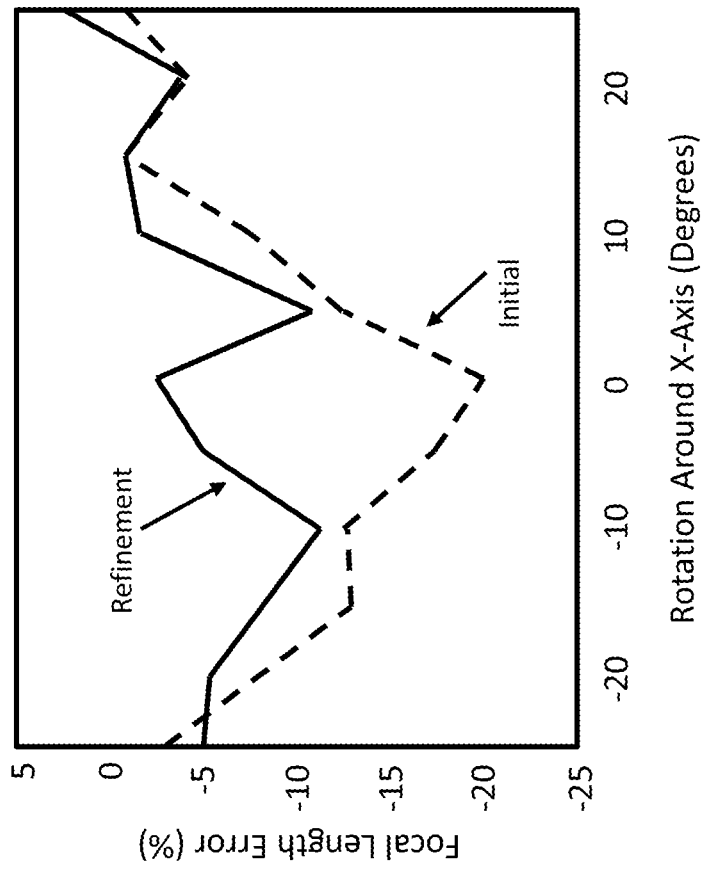
Figure 17B:
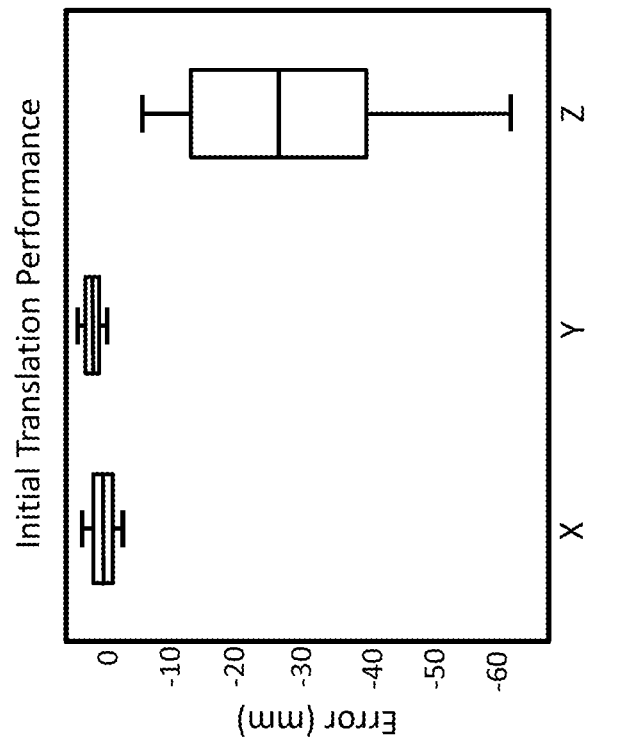
FIGS. 17A-17D depict exemplary initial translation estimations and performances in accordance with the present disclosure.
Figure 17A:
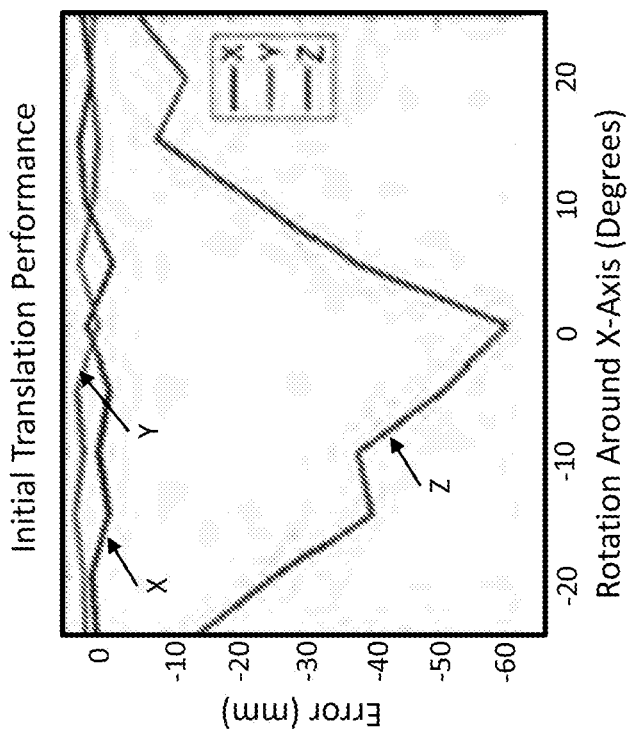
Figure 17C:
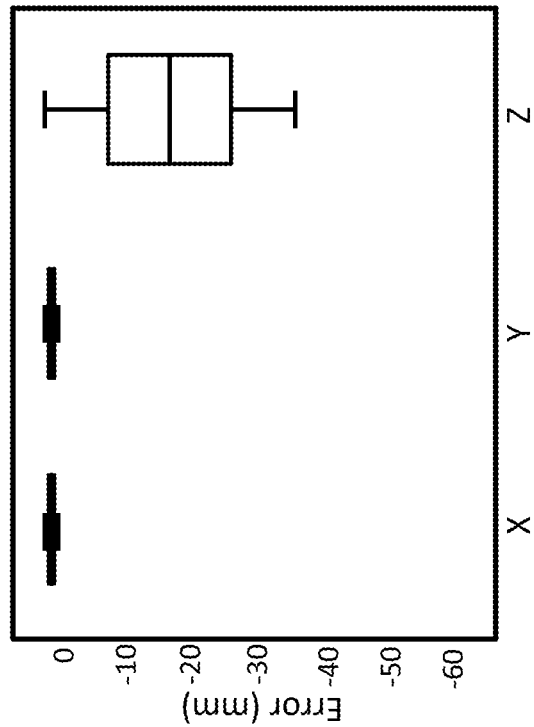
Figure 17D:
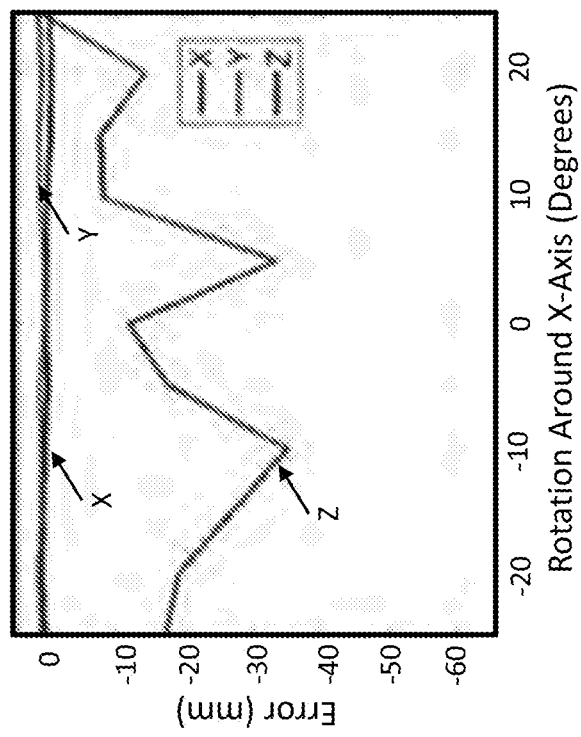
Figure 19:
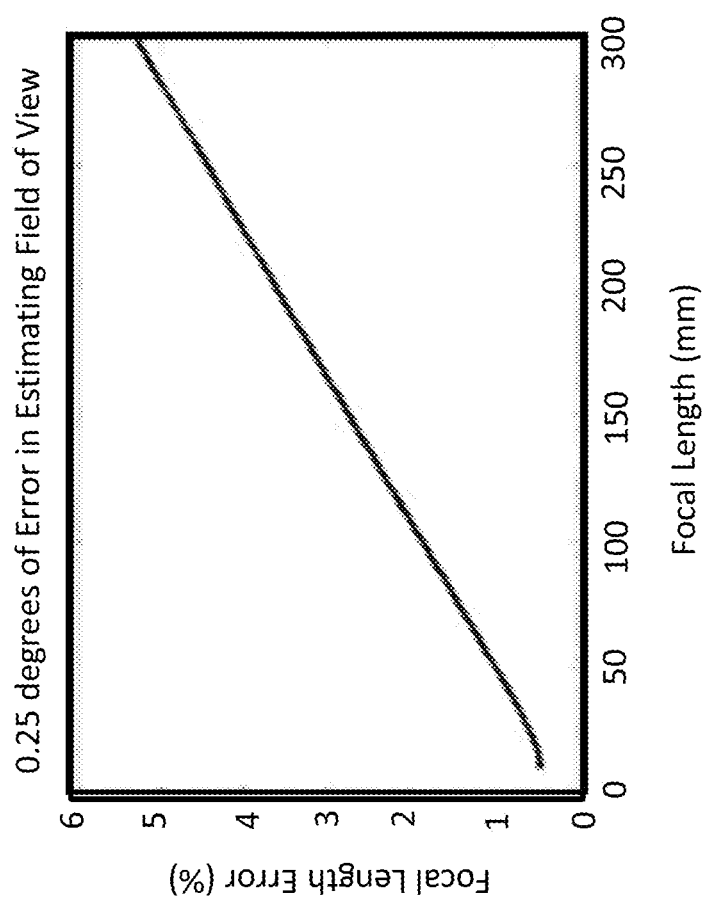
FIG. 19 depicts an exemplary embodiment of the focal length error that arises from mis-estimating a field in accordance with the present disclosure.

FIGS. 16A-16B quantified errors in the focal length estimation, and FIGS. 17A-17D quantified errors in the translation estimation. Both the initialization and refinement results showed strong correlations between the focal length error and the translation error. The refinement step reduced the error of both to a median error of about 4%. The correlation in error between the focal length and the translation arises from the ambiguity that an object can appear bigger either by moving closer to the camera or by the camera changing its focal length.

FIGS. 18A-18H showed quantitative results for focal length estimation from single images of the calibration object taken at different orientations and different focal lengths. For each image, the results showed visualize rotation by rendering the local coordinate system on top of the original image. The image title showed the ground truth focal length, the estimated focal length, and the percent error. Images from cell phone cameras were included, as well as a DSLR camera. The first two images are from an iPhone 5 and a Galaxy S6 with focal lengths of 5 and 5.8 mm, respectively. The images following those are from a Nikon D90 at focal lengths of 18, 49, 90, 115, and 185 mm.

Focal length estimates were relatively accurate for shorter focal lengths. Very long focal lengths corresponded to imaging geometries with a smaller field of view. For small fields of view, small errors in estimating angular constraints may lead to larger errors in estimating focal length. To ground this, the impact of misestimating the field of view by 0.25° was shown on the estimate of the focal length.

Example 5—Augmented Reality Application

Figure 20:
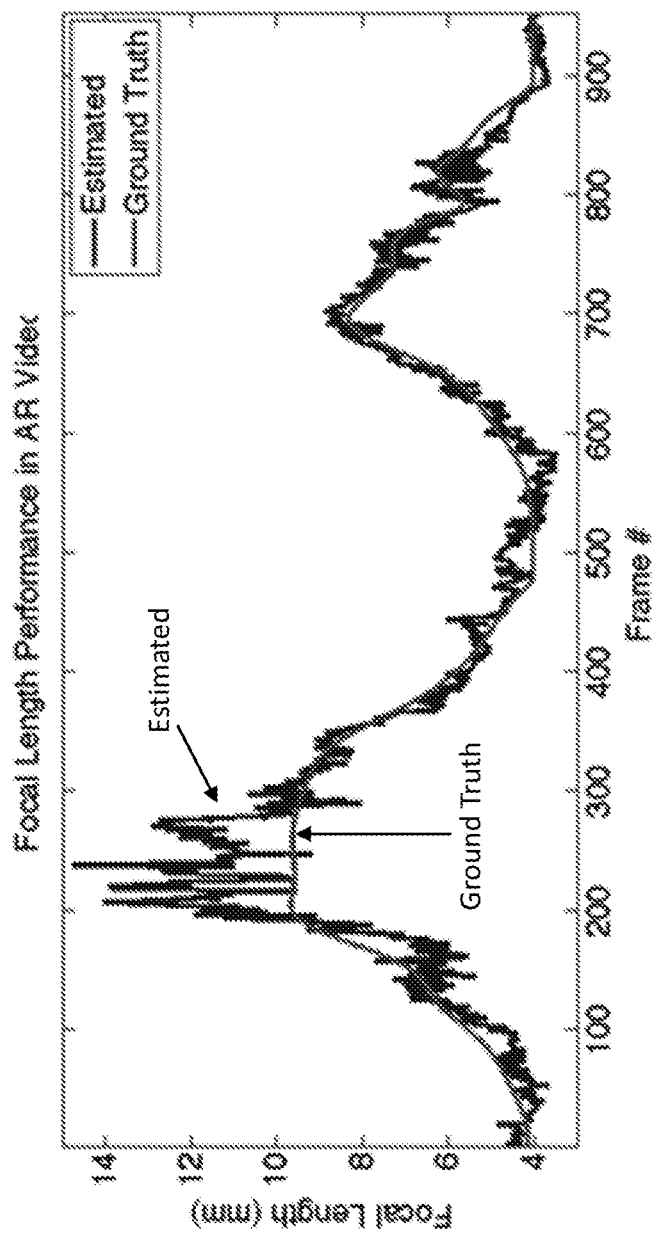
FIG. 20 depicts an exemplary embodiment of the focal length estimates and performance in accordance with the present disclosure.

In a desktop scene, video of the calibration object was recorded while moving the camera in a freehand trajectory. When the camera was moved farther away from the scene and the calibration object, digital zooming kept the calibration object as large as possible in the image. For each frame, the camera focal length, rotation, and translation were estimated using the calibration object. In FIG. 20, the estimated focal length was compared with the ground truth focal length per frame. It is seen that the focal length estimations follow the zooming trajectory well. It is emphasized that the algorithm did not have access to the digital zoom information.

Figures 21A, 21B, 21C, 21D, 21E, 21F:
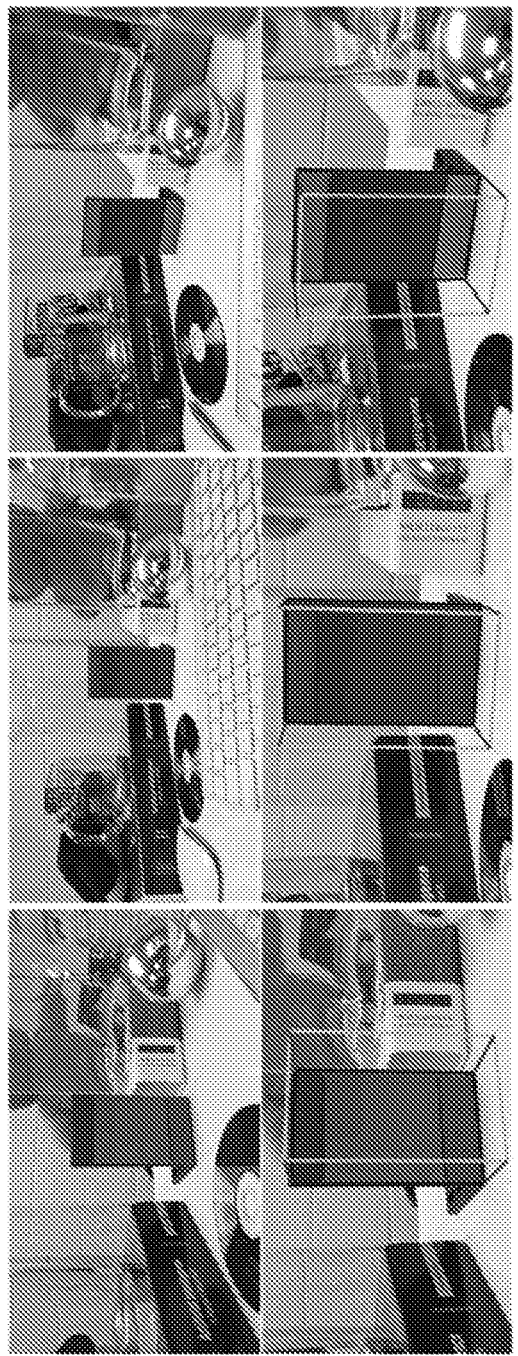

An AR algorithm was compared that doesn't have access to the digital zoom and does not have the ability to estimate it from image data. When such an algorithm used a pre-calibrated focal length, which became wrong in part of the video sequence, virtual objects were rendered with incorrect perspectives. FIGS. 21A-21I show 3 frames from the video in each column. A virtual wireframe box was rendered to highlight perspective effects. FIGS. 21A-21C show the original images, FIGS. 21D-21F show the box rendering given the estimates made with a dynamic focal length, and the FIGS. 21G-21I show the box rendering given the estimates made with a static focal length. The digital box had a base the size of the calibration object and was 45 mm deep.

Graph paper was aligned to show a Cartesian coordinate to help a viewer assess perspective effects. The wireframe box appeared aligned just short (10 mm or 2 boxes) of the end of the paper grid. In comparing the method of estimating a dynamic focal length against estimating a static focal length, it was seen that the rendered box looked unnaturally too large and with too much perspective in the case of a static focal length. This held true in general for all frames.

An additional AR video was also recorded. In this video, a 3-D model was rendered into a video with a free-hand camera zoom.

Example 6—Anchor Point Permutations and Minimum Measurable Angle Change

FIG. 22 shows the anchor points used in calibrating the HRF as blue crosses and the random perturbation as green crosses. The angular precision resolvable of a lenticular array in an image is limited by the color sensitivity of the camera and color precision of color printing. This section analyzed the theoretical angular limits of a system imaging a lenticular array using an 8-bit RGB camera. The implemented lenticular arrays had their backplane textures printed at maximum saturation and value. The saturation/value of the lenticular array's appearance to the camera, however, was determined by the amount of light in the scene and camera properties such as exposure. The amount of light affecting the angular measurement precision was explored in this example.

Figure 23B:
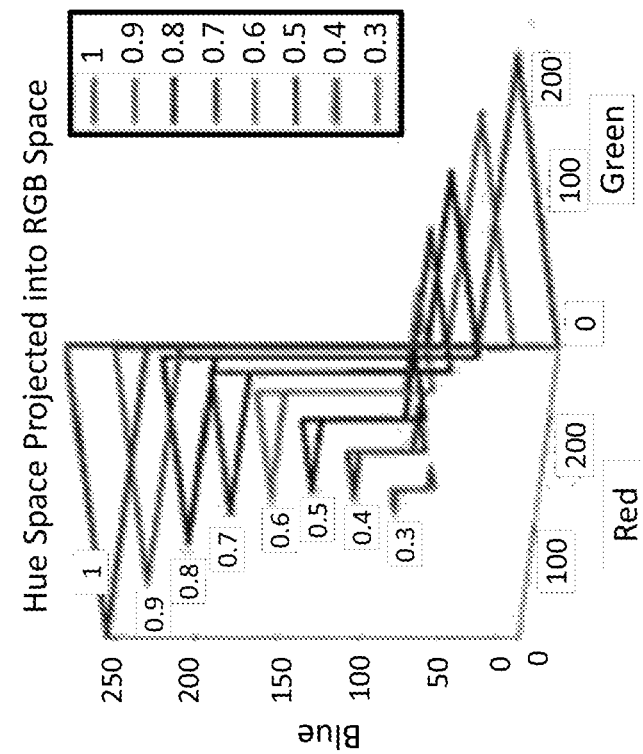
FIGS. 23A and 23B depict exemplary embodiments of the space of hues with a constant saturation and value on a manifold in RGB space.
Figure 23A:
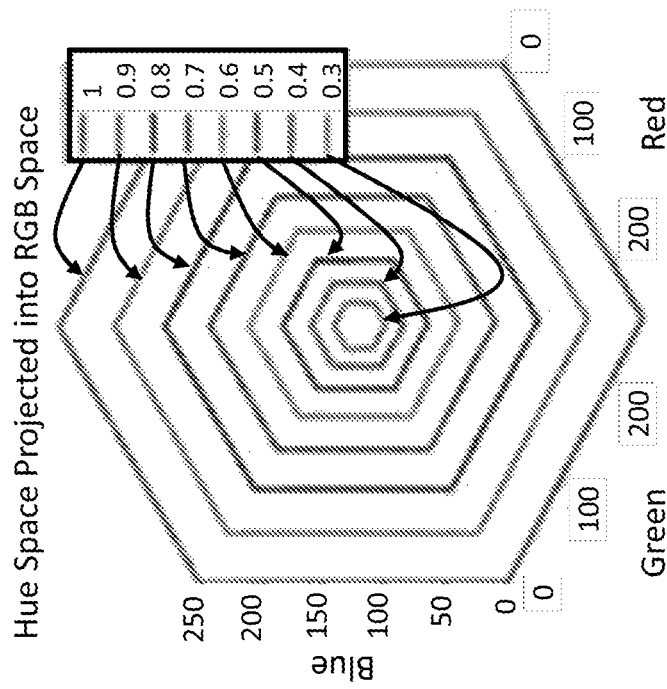

The set of RGB values corresponding to the hue wheel for a given saturation/value level lay on a 2-D manifold in RGB space. This manifold represented the set of RGB measurements a camera would take of a lenticular array in any orientation. In FIGS. 23A and 23B, two views of these manifolds are shown for various levels of saturation and value. The manifolds created a cycle along the sides of a cube aligned with RGB space. Interestingly, as the amount of light (saturation and value) went down, the set of RGB values corresponding to the hue wheel got smaller.

Figure 24B:
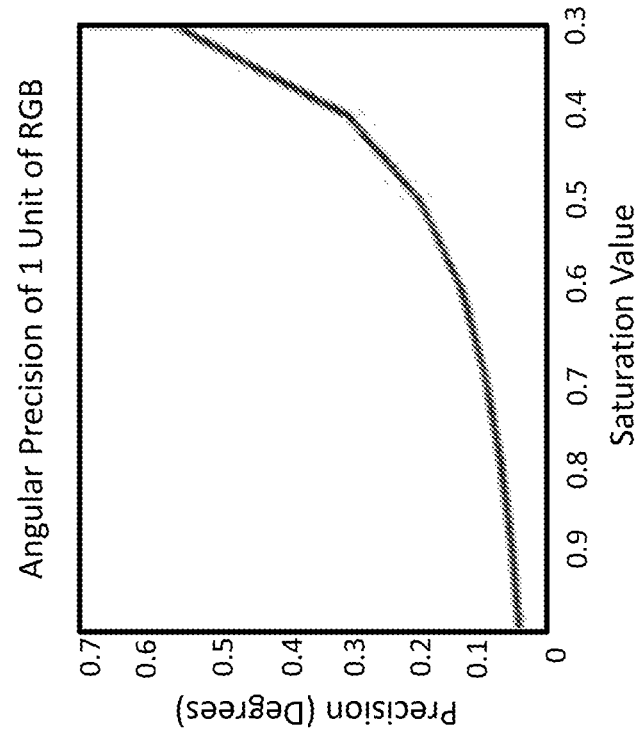
FIGS. 24A and 24B depict exemplary embodiments of RGB measurements in accordance with the present disclosure.
Figure 24A:
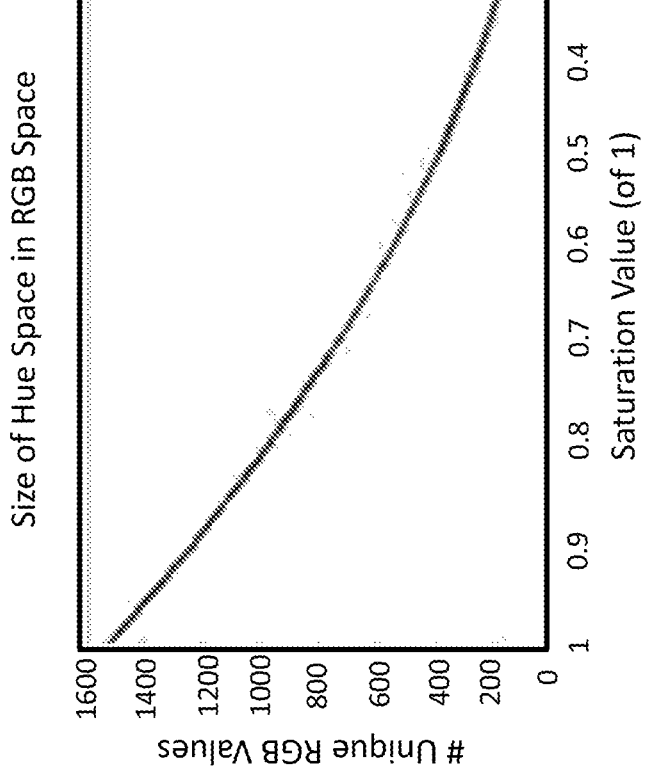

In FIG. 24A, the number of unique 8-bit RGB triplets for each manifold are shown, or each saturation/value level. The set of 1-to-1 view points of the lenticular array (76 degree range of incident angles) was mapped to the hue wheel and therefore to the RGB manifold. Thus, the angular precision is 76/the number of unique rgb values. In FIG. 24B, the angular precision for each level of saturation/value was shown. In the best possible case with maximum saturation and value, an 8-bit RGB camera was able to resolve the angle of a lenticular array at a precision of 0.05 degrees. However, at 0.3 saturation/value, the precision dropped to 0.55 degrees. The hue measurements had a mean saturation and value of 0.7 and ranged from 0.5 to 0.9. Therefore, the angular error of 0.25 degrees induced by moving anchor points was not due to the inherent precision limitations of the 8-bit RGB camera imagining the lenticular arrays.

The angular precision achievable by a camera can be greatly improved by moving to a larger color representation. In FIGS. 25A and 25B, the same experiment was run but for a 12-bit camera. With 16 times more possible values for a single color channel versus an 8-bit camera, the number of unique RGB values for the color wheel and the angular precision both improved by an order of magnitude.

Example 7—Augmented Reality Video

The approach was demonstrated with a second AR video where the camera was static with a varying zoom, and the calibration object was being rotated randomly. In this video, the zoom was achieved via a zoom lens. In one video, the wire-mesh of a box was overlayed to compare dynamic focal length estimation versus static focal length estimation. In a second video, instead of a box wiremesh, a 3-D model of a parrot was overlayed over the frames of the image. In FIGS. 26A-26F, frames of this video are shown. Just like in the previous results, the dynamic focal length estimation ensured that the 3-D model was rendered with the correct perspective, no matter the zoom level.

What is claimed is:

1. A method of calibrating a camera, the method comprising:
   creating a light field with a lenticular array, the lenticular array comprising at least one sheet, the at least one sheet comprising a plurality of colors; and,
   using a single picture of the light field to calibrate the camera, wherein the camera is calibrated without information from a correspondence between a point on an image and a point on a calibration object.

2. The method of claim 1, wherein the plurality of colors are visible at a plurality of locations on the sheet.

3. The method of claim 1, wherein the sheet comprises plastic.

4. The method of claim 1, wherein the at least one sheet comprises a plurality of parallel cylindrical lenses.

5. A method of calibrating a camera for an augmented reality application, the method comprising:
   using a calibration object to create a color-coded light field, wherein the calibration object is based on at least one lenticular array, each lenticular array comprising at least one sheet, the at least one sheet comprising a plurality of colors;
   estimating a focal length of the camera and a relative orientation and position of the object from a single image; and,
   calibrating the camera, wherein the camera is calibrated without information from a correspondence between a point on an image and a point on a calibration object.

6. The method of claim 5, wherein the plurality of colors are visible at a plurality of locations on the sheet.

7. The method of claim 5, wherein the sheet comprises plastic.

8. The method of claim 5, wherein the at least one sheet comprises a plurality of parallel cylindrical lenses.

* * * * *